US010009074B2

(12) United States Patent
Takano

(10) Patent No.: US 10,009,074 B2
(45) Date of Patent: Jun. 26, 2018

(54) WIRELESS COMMUNICATION DEVICE, WIRELESS COMMUNICATION SYSTEM, WIRELESS COMMUNICATION METHOD, AND COMPUTER-READABLE MEDIUM FOR TRANSMISSION OF TRANSMISSION WEIGHT INFORMATION

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 14/700,726

(22) Filed: Apr. 30, 2015

(65) Prior Publication Data
US 2015/0237522 A1   Aug. 20, 2015

Related U.S. Application Data

(63) Continuation of application No. 13/704,254, filed as application No. PCT/JP2011/064218 on Jun. 22, 2011, now Pat. No. 9,648,622.

(30) Foreign Application Priority Data

Aug. 25, 2010   (JP) .................................. 2010-188129

(51) Int. Cl.
H04B 7/04       (2017.01)
H04B 7/0452   (2017.01)
(Continued)

(52) U.S. Cl.
CPC ......... *H04B 7/0452* (2013.01); *H04L 5/0048* (2013.01); *H04W 24/10* (2013.01)

(58) Field of Classification Search
CPC . H04W 72/046; H04B 7/0413; H04B 7/0452; H04B 7/0626; H04B 7/0632; H04B 7/0842; H04B 7/061
See application file for complete search history.

(56) References Cited

U.S. PATENT DOCUMENTS 6,748,024 B2   6/2004   Kuchi et al.
8,315,221 B2 *  11/2012  Choudhury ........... H04L 1/0026
                                                         370/329
(Continued)

FOREIGN PATENT DOCUMENTS

CN   101405959   4/2009
CN   101641988   2/2010
(Continued)

OTHER PUBLICATIONS

Office Action dated Jul. 28, 2015 in Japanese Patent Application No. 2014-150820.
(Continued)

*Primary Examiner* — Hassan Kizou
*Assistant Examiner* — Roberta A Shand
(74) *Attorney, Agent, or Firm* — Oblon, McClelland, Maier & Neustadt, L.L.P.

(57) ABSTRACT

An electronic device including circuitry configured to cause receipt of a first reference signal and determine first transmission weight information based on the received first reference signal. The circuitry is configured to cause receipt of a second reference signal and determine second transmission weight information based on the received second reference signal. The second reference signal is weighted. The circuitry is further configured to cause transmission of the first transmission weight information according to a first period and the second transmission weight information according to a second period. The first period is different from the second period. Further, the second transmission weight information is determined and transmitted after the first transmission weight information is transmitted.

27 Claims, 15 Drawing Sheets

(51) Int. Cl.
    *H04W 24/10*     (2009.01)
    *H04L 5/00*     (2006.01)

(56) References Cited

U.S. PATENT DOCUMENTS

| | | | | |
|---|---|---|---|---|
| 8,750,253 | B2* | 6/2014 | Petersson | H04B 1/56 370/334 |
| 2008/0212702 | A1 | 9/2008 | Pan et al. | |
| 2008/0225823 | A1 | 9/2008 | Tenny | |
| 2010/0195615 | A1 | 8/2010 | Lee et al. | |
| 2010/0266057 | A1* | 10/2010 | Shrivastava | H04L 5/0091 375/260 |
| 2011/0002415 | A1 | 1/2011 | Nakao et al. | |
| 2011/0044161 | A1* | 2/2011 | Ikeda | H04L 5/0048 370/210 |
| 2011/0249588 | A1 | 10/2011 | Petersson et al. | |
| 2011/0268028 | A1* | 11/2011 | Stern-Berkowitz | H04L 27/2613 370/328 |
| 2015/0237522 | A1* | 8/2015 | Takano | H04W 24/10 370/329 |

FOREIGN PATENT DOCUMENTS

| | | |
|---|---|---|
| JP | 2005-503045 | 1/2005 |
| JP | 2005-184730 | 7/2005 |
| JP | 2005-323216 A | 11/2005 |
| JP | 2009-71825 A | 4/2009 |
| JP | 2009-526480 A | 7/2009 |
| JP | 2009-530988 A | 8/2009 |
| JP | 2010-521895 | 6/2010 |
| JP | 2010-521895 A | 6/2010 |
| JP | 2010-523041 A | 7/2010 |
| JP | 2010-523041 A5 | 7/2010 |
| KR | 20090130372 | 12/2009 |
| WO | WO 02/41524 | 5/2002 |
| WO | WO 2008/139630 A1 | 11/2008 |
| WO | WO 2009/122658 | 10/2009 |
| WO | WO 2010/071492 A1 | 6/2010 |

OTHER PUBLICATIONS

Extended European Search Report dated Sep. 16, 2015 in Patent Application No. 11819667.4.
"Deriving explicit channel information from PMI" Philips—3GPP TSG RAN WG1 Meeting #61, XP050420090, May 4, 2010, 2 Pages.
"Codebook-Based Feedback Issues on 8Tx Downlink MIMO" Texas Instruments—3GPP TSG RAN WG1 60, XP050418653, Feb. 16, 2010, 7 Pages.
International Search Report dated Aug. 9, 2011 in PCT/JP2011/064218.
"Weighted CSI Feedback aided DL CoMP transmissions", 3GPP TSG-RAN WG1 #58bis, http://ww.3gpp.org/ftp/tsg_ran/wg1_r11/TSGR1_58b/Docs/R1-093782.zip, Oct. 12-16, 2009, 8 pp.
"4 Tx Codebook Design based on Two-Component Framework", 3GPP TSG RAN1 #62, http://www.3gpp.org/ftp/tsg_ran/wg1_r11/TSGR1_62/Docs/R1-104980.zip, Aug. 23-27, 2010, 15 pp.
Combined Office Action and Search Report dated Dec. 1, 2014, in Chinese Patent Application No. 201180039971.1 (with English language translation).
Office Action dated Jan. 12, 2016 in Japanese Patent Application No. 2015-082346.
Qinghua Li, et al. "MIMO Techniques in WiMAX and LTE: A Feature Overview" Topics in Wireless Communications, IEEE Communications Magazine, May 2010, pp. 86-92 and Cover Page.
Office Action dated Feb. 23, 2016 in Japanese Patent Application No. 2015-082345 (with English language translation).
"Development of two-stage Feedback Framework for Rel-10" Alcatel-Lucent Shanghai Bell, Alcatel-Lucent, 3GPP TSG RAN WG1 #60bis Meeting, R1-101859, Apr. 12-16, 2010, 6 Pages.
"Further Views on CSI Feedback for LTE-Advanced" NTT DOCOMO, 3GPP TSG RAN WG1 Meeting #61, R1-103258, May 10-14, 2010, pp. 1-6 and cover page.
"Considerations on the Rel-10 Feedback Framework" CHTTL, 3GPP TSG RAN WG1 Meeting #61, R1-103237, May 10-14, 2010, pp. 1-4 and cover page.
Communication Pursuant to Article 94(3) EPC dated Jun. 16, 2016 in European Application No. 11 819 667.4.
Office Action dated Jul. 28, 2017 in Chinese Patent Application No. 201510232534.1 (With English Translation).
Office Action dated Sep. 5, 2017 in Chinese Patent Application No. 201510233030.1(With English Translation).
Notice of Preliminary Rejection dated Jul. 17, 2017 in Korean Patent Application No. 10-2013-7003780 (with English Translation).
"Considerations on PMI feedback for SU/MU-MIMO", Sony Corporation, 3GPP TSG RAN WG1#60bis, R1-102254, Apr. 16, 2010, pp. 1-4.
Office Action dated Nov. 1, 2017 in Korean Patent Application No. 10-2015-7023159 (With English Translation).
"Adaptive Feedback: A New Perspective of the Adaptive Codebook", Huawei, 3GPP TSG RAN WG1 meeting #58, R1-093059, Aug. 24-28, 2009, pp. 1-5.
Extended European Search Report dated Dec. 14, 2016 in European Patent Application No. 16188965.4.
Office Action dated Jan. 30, 2018 in Korean Patent Application No. 10-2013-7003780 (With English Translation).
Office Action dated Apr. 8, 2018 in Chinese Patent Application No. 201510232534.1 (With English Translation).

* cited by examiner

WIRELESS COMMUNICATION DEVICE, WIRELESS COMMUNICATION SYSTEM, WIRELESS COMMUNICATION METHOD, AND COMPUTER-READABLE MEDIUM FOR TRANSMISSION OF TRANSMISSION WEIGHT INFORMATION

CROSS-REFERENCE TO RELATED APPLICATIONS

This application is a continuation of U.S. application Ser. No. 13/704,254 filed Dec. 14, 2012, the entire content of which is incorporated herein by reference. U.S. application Ser. No. 13/704,254 is a National Stage of PCT/JP11/064218 filed Jun. 22, 2011, and is based upon and claims the benefit of priority from prior Japanese Patent Application No. 2010-188129 filed Aug. 25, 2010.

TECHNICAL FIELD

The present disclosure relates to a wireless communication device, a wireless communication system, a wireless communication method, and a program.

BACKGROUND ART

Currently, in third generation partnership project (3GPP), standardization of a wireless communication system for 4G has been promoted. In 4G, a technology such as relay, carrier aggregation, coordinated multiple point transmission and reception (CoMP), and multi user multi input multi output (MU-MIMO) has been attracting attention.

Relay is considered as an important technology to improve a throughput of a cell edge. In addition, carrier aggregation is a technology that can handle a band width of 20 MHz×5=100 MHz by handling, for example, five frequency bands each having a band width of 20 MHz, together. By such carrier aggregation, improvement of a maximum throughput can be expected.

In addition, CoMP is a technology in which a plurality of base stations transmit and receive data in cooperation in order to improve coverage of a high data rate. In addition, MU-MIMO is a technology that improves a system throughput so that a plurality of users use a resource block of the same frequency and the same time, on which spatial multiplexing is performed. As described above, further improvement of the performance in 4G (LTE-Advanced) by various technologies has been discussed.

Here, MU-MIMO is described in detail. In 3.9G (LTE), there are technologies of MU-MIMO and single user MIMO (SU-MIMO). For example, as discussed in Patent literature 1, SU-MIMO is a technology in which a plurality of channels are used so that single user equipment (UE) performs spatial multiplexing of the plurality of channels although spatial multiplexing is not performed between pieces of UE.

On the other hand, as described above, MU-MIMO is a technology in which each UE uses a resource block of the same frequency and the same time, on which spatial multiplexing is performed (spatial multiplexing is performed between pieces of UE). However, in MU-MIMO that is realized in 3.9G, each UE handles a mere single channel. On the contrary, in 4G, MU-MIMO in which each UE can handle a plurality of channels is being realized.

In order to achieve such MU-MIMO in 4G, it has been studied that two types (V1 and V2) of transmission weight are used in a base station. The V1 is transmission weight that realizes directivity, and the V2 is transmission non-directional weight, the main purpose of which is to adjust a phase. The V1 and V2 can be determined, for example, in UE. To be more specific, the UE receives a reference signal that is transmitted from a base station, obtains a channel matrix H from the reception result of the reference signal, and determines optimal V1 and V2 for the channel matrix H.

CITATION LIST

Patent Literature

Patent Literature 1: JP 2005-184730A

SUMMARY OF INVENTION

Technical Problem

However, high calculation load in UE for determining transmission weight V1 and transmission weight V2 is concerned because the transmission weight V1 and transmission weight V2 are complex numbers.

Therefore, in the present disclosure, there are proposed a new and improved wireless communication device, wireless communication system, wireless communication method, and program that can suppress calculation load in a communication partner for determining transmission weight.

Solution to Problem

According to an embodiment of the present disclosure, there is provided a wireless communication device including a communication unit that transmits a reference signal, a first multiplication unit that performs multiplication of first transmission weight that is determined based on reception of the reference signal by a communication partner, and a second multiplication unit that performs multiplication of second transmission weight that is determined based on reception of the reference signal by the communication partner. The communication unit transmits a reference signal with weight that is obtained by multiplying the reference signal by the first transmission weight after determination of the first transmission weight.

The wireless communication device may further includes a reference signal management unit that manages a resource for transmitting the reference signal with weight.

The reference signal management unit may allocate a resource for transmitting the reference signal with weight and a resource for transmitting the reference signal after determination of the first transmission weight.

The reference signal management unit may allocate more resources for transmitting the reference signal than the resource for transmitting the reference signal with weight.

The reference signal management unit may allocate a resource so that transmission frequency of the reference signal on a time axis becomes higher than transmission frequency of the reference signal with weight on the time axis.

The reference signal management unit may allocate a resource so that a density of a resource for transmitting the reference signal on a frequency axis becomes higher than a density of a resource for transmitting the reference signal with weight on the frequency axis.

The wireless communication device may further include a scheduler that allocates a resource for communication of a first scheme or a second scheme to each communication partner. The scheduler may allocate a resource within a first frequency range for the communication of the first scheme, and allocate a resource within a second frequency range for the communication of the second scheme.

The first frequency range may be a frequency range to which a resource for transmitting the reference signal with weight is allocated. The second frequency range may be a frequency range to which a resource for transmitting the reference signal is allocated.

The first scheme may be multi user multi input multi output (MU-MIMO), the second scheme may be single user multi input multi output (SU-MIMO).

The wireless communication device may further include a scheduler that allocates a resource for communication of a first scheme or a second scheme to each communication partner. The scheduler may allocate, for the communication of the first scheme, a resource within a frequency range to which a resource for transmitting the reference signal with weight is allocated, and allocate, for the communication of the first scheme or the second scheme, a resource within a frequency range to which a resource for transmitting the reference signal is allocated.

Update frequency of the second transmission weight may be higher than update frequency of the first transmission weight.

The first transmission weight may be weight for forming directivity, and the second transmission weight may be non-directional weight for adjusting a phase.

Further, according to another embodiment of the present disclosure, there is provided a program for causing a computer to function as a wireless communication device that includes a communication unit that transmits a reference signal, a first multiplication unit that performs multiplication of first transmission weight that is determined based on reception of the reference signal by a communication partner, and a second multiplication unit that performs multiplication of second transmission weight that is determined based on reception of the reference signal by the communication partner. The communication unit may transmit a reference signal with weight that is obtained by multiplying the reference signal by the first transmission weight after determination of the first transmission weight.

Further, according to another embodiment of the present disclosure, there is provided a wireless communication method including transmitting a reference signal, multiplying the reference signal by first transmission weight that is determined based on reception of the reference signal by a communication partner, and transmitting a reference signal with weight that is obtained by multiplying the reference signal by the first transmission weight.

Further, according to another embodiment of the present disclosure, there is provided a wireless communication system including a first wireless communication device, and a second wireless communication device that includes, a communication unit that transmits a reference signal, a first multiplication unit that performs multiplication of first transmission weight that is determined based on reception of the reference signal by the first wireless communication device, and a second multiplication unit that performs multiplication of second transmission weight that is determined based on reception of the reference signal by the first wireless communication device. The communication unit transmits a reference signal with weight that is obtained by multiplying the reference signal by the first transmission weight after determination of the first transmission weight.

Further, according to another embodiment of the present disclosure, there is provided a wireless communication device including a communication unit that receives a reference signal from a communication partner, and a weight determination unit that determines first transmission weight and second transmission weight based on a reception result of the reference signal by the communication unit. When a reference signal with weight that is obtained by multiplying the reference signal by the first transmission weight is received by the communication unit, the weight determination unit determines the second transmission weight based on a reception result of the reference signal with weight.

Further, according to another embodiment of the present disclosure, there is provided a wireless communication device including a scheduler that allocates a resource for communication of a first scheme or a second scheme to each communication partner. The scheduler allocates a resource within a first frequency range for the communication of the first scheme, and allocates a resource within a second frequency range for the communication of the second scheme.

The first scheme may be multi user multi input multi output (MU-MIMO), and the second scheme may be single user multi input multi output (SU-MIMO).

Advantageous Effects of Invention

As described above, according to the present disclosure, calculation load in a communication partner for determining transmission weight can be suppressed.

DESCRIPTION OF EMBODIMENTS

Figure 1:
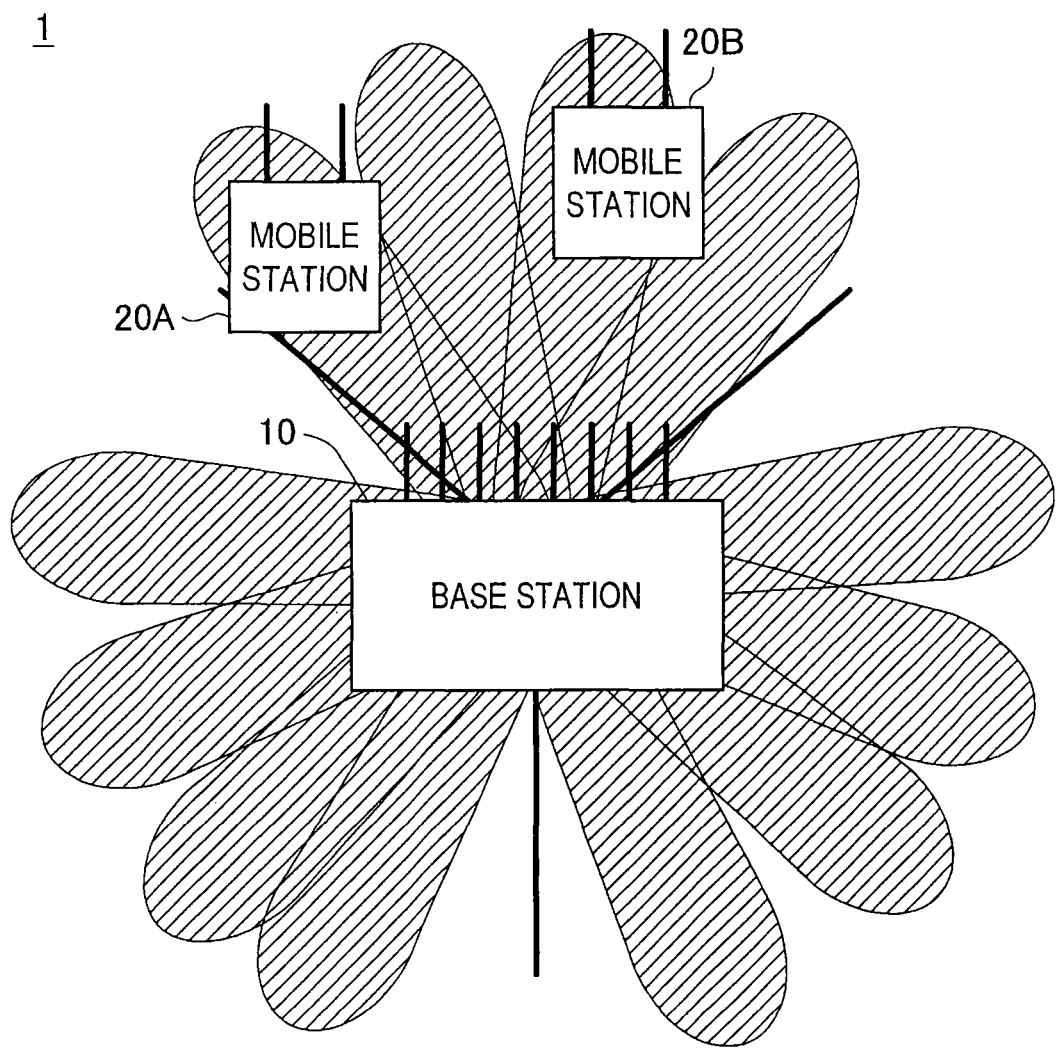
FIG. 1 is an illustrative diagram illustrating a configuration of a wireless communication system according to an embodiment of the present disclosure.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In addition, in this specification and drawings, a plurality of elements having substantially the same function and structure may be distinguished so as to be denoted with different alphabets after the same reference numeral. For example, a plurality of configurations having substantially the same function and structure such as mobile stations 20A, 20B, and 20C may be distinguished as appropriate. However, when there is no particular need to distinguish a plurality of elements having substantially the same function and structure individually, the plurality of elements are denoted with the mere same reference numeral. For example, when there is no particular need to distinguish mobile stations 20A, 20B, and 20C, the mobile stations are merely referred to as mobile station 20.

In addition, "Description of Embodiments" is made in accordance with the order of the following items.
1. Outline of a wireless communication system
1-1. Configuration of the wireless communication system
1-2. Transmission weight (V1 and V2)
1-3. Feedback scheme of transmission weight
1-4. Dynamic switching
1-5. Comparative example
2. Basic configuration of a base station
3. Basic configuration of a mobile station
4. Description of each embodiment
4-1. First embodiment
4-2. Second embodiment
4-3. Third embodiment
4-4. Fourth embodiment
4-5. Fifth embodiment
4-6. Sixth embodiment
4-7. Seventh embodiment
5. Operation of the base station and the mobile station
6. Conclusion

1. OUTLINE OF A WIRELESS COMMUNICATION SYSTEM

Currently, in 3GPP, standardization of a wireless communication system for 4G has been promoted. An embodiment of the present disclosure can be applied to the wireless communication system for 4G as an example, and, first, the outline of the wireless communication system for 4G is described.

1-1. Configuration of a Wireless Communication System

FIG. 1 is an illustrative diagram illustrating a configuration of a wireless communication system 1 according to an embodiment of the present disclosure. As illustrated in FIG. 1, the wireless communication system 1 according to the embodiment of the present disclosure includes a base station 10 and a plurality of mobile stations 20. Note that the base station 10 may a wireless communication device such as eNodeB, a relay node, or home eNodeB that is a household small base station in 4G. In addition, the mobile station 20 may be a wireless communication device such as a relay node or UE in 4G.

The base station 10 controls communication with the mobile station 20 in a cell. In addition, the base station 10 is operated using three sectors so that each of the sectors has, for example, an angle of 120 degrees as illustrated in FIG. 1. In addition, the base station 10 includes a plurality of antennas, and can form directivity in a plurality of directions in each of the sectors (four directions in the example illustrated in FIG. 1) by multiplying a transmission signal from each of the antennas by transmission weight V1 that is described later.

Therefore, the base station 10 can perform multiplexing so that mobile stations 20A and 20B that exist in different directions when viewed from the base station 10 are spatially separated. That is, the base station 10 can communicate with the plurality of the mobile stations 20 by MU-MIMO. Note that the base station 10 can also communicate with the mobile stations 20 by SU-MIMO.

The mobile station 20 is a wireless communication device that communicates with the base station 10 by MU-MIMO or SU-MIMO. The mobile station 20 moves in accordance with the movement of a moving body such as a user and a vehicle. Note that, in the embodiment, the mobile station 20 is described as an example of a wireless communication device that wirelessly communicates with the base station 10, and the embodiment can be also applied to a wireless communication device that is installed in a fixed manner.

1-2. Transmission Weight (V1 and V2)

In 4G, in the realization of the MU-MIMO, it is has been studied that transmission weight that is referred to as V2 is used in addition to the V1 that is described above (double codebook scheme). The V1 is transmission weight that realizes directivity as described above. Such V1 has a characteristic such as coverage of a wide frequency area and lower update frequency than that of the V2.

On the other hand, the V2 is transmission non-directional weight, the main purpose of which is to adjust a phase. More specifically, the V2 is used for maximizing reception power by adjusting a phase of each path between antennas of the mobile station 20 and the base station 10. In addition, the V2 has a characteristic such as coverage of a narrow frequency area and higher update frequency than that of the V1.

Figure 2:
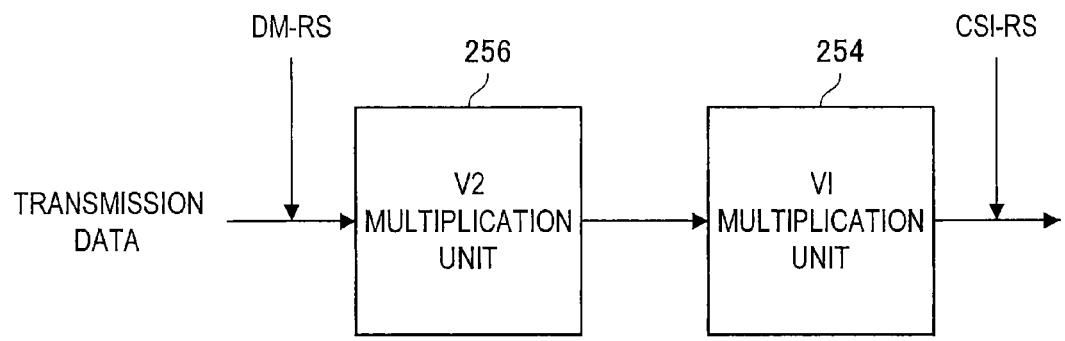
FIG. 2 is an illustrative diagram illustrating an example of multiplication order of transmission weight.

The base station 10 according to the embodiment realizes MU-MIMO by multiplying transmission data by such transmission weight V1 and transmission weight V2. Note that, as illustrated in FIG. 2, the base station 10 may multiply transmission data by transmission weight in order of V2 and V1, and may multiply transmission data by transmission weight in order of V1 and V2.

Figure 3:
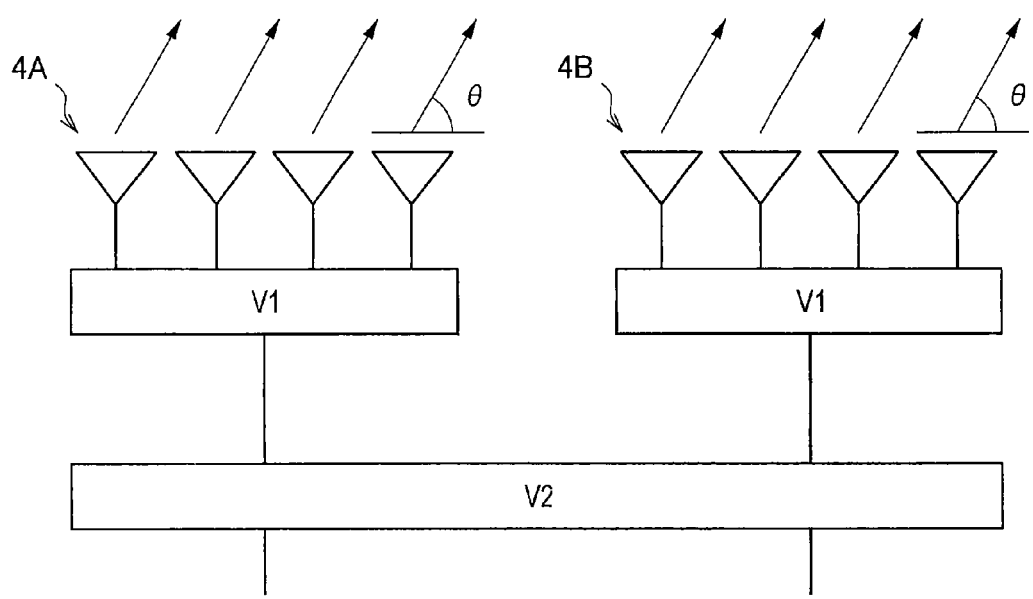
FIG. 3 is an illustrative diagram illustrating relationship of V1 and V2.

FIG. 3 is an illustrative diagram illustrating a relationship of V1 and V2. As illustrated in FIG. 3, when the base station 10 includes 8 antennas, these antennas operate as two set of linear array antennas 4A and 4B each of which is constituted of four elements. Note that the linear array antennas 4A and 4B operate as array antennas having the same directivity as illustrated in FIG. 3.

In addition, the V2 operates so that two code words of transmission data are distributed into the two set of linear array antennas 4A and 4B by changing the phase. That is, the V2 operates so as to change the phase of a transmission signal to be supplied to the linear array antennas 4A and 4B that perform transmission in the same direction. On the other hand, the V1 is applied to each antenna as illustrated in FIG. 3 and operates so that the linear array antennas 4A and 4B form directivity.

Specific examples of the above-described V1 and V2 are described below. Note that "d" in "Formula 1" that represents the V1 indicates a distance from a reference antenna, "λ" indicates a wavelength, "θ" indicates a direction of beam, and "i" indicates an antenna number. In addition, "H" in "Formula 2" that represents V2 indicates a channel matrix.

$$V1(i) = \begin{bmatrix} 1 \\ \exp(-j2\pi/\lambda * d1\sin\theta(i)) \\ \exp(-j2\pi/\lambda * d2\sin\theta(i)) \\ \exp(-j2\pi/\lambda * d3\sin\theta(i)) \end{bmatrix}$$ [Math. 1]

$$V2 = \begin{bmatrix} 1 & 1 \\ 1 & -1 \end{bmatrix}, \begin{bmatrix} 1 & 1 \\ j & -j \end{bmatrix}$$ [Math. 2]

As illustrated in "Formula 2", the V2 is transmission weight that is represented as plus or minus 1, or plus or minus j. Note that the j indicates an imaginary number. Thus, a load for multiplying a certain matrix by the V2 is small. On the other hand, the V1 is transmission weight that is described by a directional vector, and is not a matrix that is represented by plus or minus 1 and plus or minus j. Therefore, in calculation using the V1, calculation load is increased.

Note that when transmission data of the base station 10 is "S" and reception data of the mobile station 20 is "R", the reception data R of the mobile station 20 can be represented as the following "Formula 3" or "Formula 4".

$$R = H \cdot V1 \cdot V2 \cdot S$$ [Math. 3]

$$R = H \cdot V2 \cdot V1 \cdot S$$ [Math. 4]

1-3. Feedback Scheme of Transmission Weight

As a feedback scheme of MIMO for determining the above-described transmission weight V1 and transmission weight V2, three schemes of implicit feedback, explicit feedback, and SRS-based feedback are conceivable. In 4G, as a feedback scheme of MIMO for determining the transmission weight V1 and transmission weight V2, the use of the implicit feedback is determined because a load on a feedback circuit is small. For reference, each of the feedback schemes in 3.9G (LTE) is described below.

(1) Implicit Feedback

In a base station, 16 types of transmission weight (V1) to transmission weight (V16) are prepared (pre-coded) for a coodbook that has been designed in beforehand. A mobile station that receives a reference signal from the base station obtains a channel matrix H between the base station and mobile station. In addition, the mobile station pre-determines HV having the highest reception power from among HV (1), HV (2), . . . , HV (16). After that, the mobile station provides feedback of an index number that indicates V that makes reception power maximum, to the base station. The base station transmits data using the V corresponding to the index that is fed back.

(2) Explicit Feedback

The base station transmits a reference signal, and the mobile station that receives the reference signal from the base station obtains a channel matrix H between the base station and the mobile station similarly to the case of the implicit feedback. In addition, the mobile station provides feedback of the channel matrix H as-is, to the base station. The base station calculates and creates a desired transmission weight from the channel matrix H in downlink that is fed back from the mobile station. In addition, the base station transmits data using the created transmission weight. In this explicit feedback, there is a problem that a resource that is used for feedback becomes larger than that of the implicit feedback because a channel matrix H is transmitted as-is at the time of feedback.

(3) SRS-Based Feedback

The mobile station transmits a reference signal, and the base station that receives the reference signal from the mobile station obtains a channel matrix in uplink between the mobile station and the base station. When the reversibility of a channel can be established (in a case of a TDD mode), the base station can makes a virtual channel matrix in downlink from the channel matrix. A scheme in which a virtual channel matrix in downlink is made as described above is the SRS-based feedback. In the SRS-based feedback, there is a problem such that, when calibration is not performed in which variations of analog circuits in the base station are compensated, the reversibility of channels in uplink and downlink (channel matrix that includes a characteristic of the analog circuit) is not established.

1-4. Dynamic Switching

In 4G (LTE-Advanced), it is has been studied that setting of MIMO is dynamically switched between MU-MIMO and SU-MIMO. In addition, in MU-MIMO in 4G, the use of eight streams has been studied. In the case of eight streams, one matrix for phase adjustment of V2 as described in "1-2. Transmission weight (V1 and V2)" is used.

The example is described above in which MU-MIMO is realized by combining V1 having a 4×4 matrix and V2 having a 2×2 matrix. On the other hand, mere V2 having an 8×8 matrix is used for SU-MIMO. In addition, each element of the V2 having the 8×8 matrix is represented by the plus or minus 1 and plus or minus j, similarly to the V2 having the 2×2 matrix. Note that j indicates an imaginary number.

As described above, different V2 are used for MU-MIMO and SU-MIMO, and, in this specification, V2 for MU-MIMO is referred to as V2_MU, and weight for SU-MIMO is referred to as V2_SU, thereby distinguishing the two of V2.

1-5. Comparative Example

In 4G and the embodiments, as described in "1-3. Feedback scheme of transmission weight," the transmission weight V1 and transmission weight V2_MU are determined by implicit feedback. Here, in order to clarify the technical significance of the embodiments, a determination method using a comparative example of the transmission weight V1 and transmission weight V2_MU is described with reference to FIG. 4.

Figure 4:
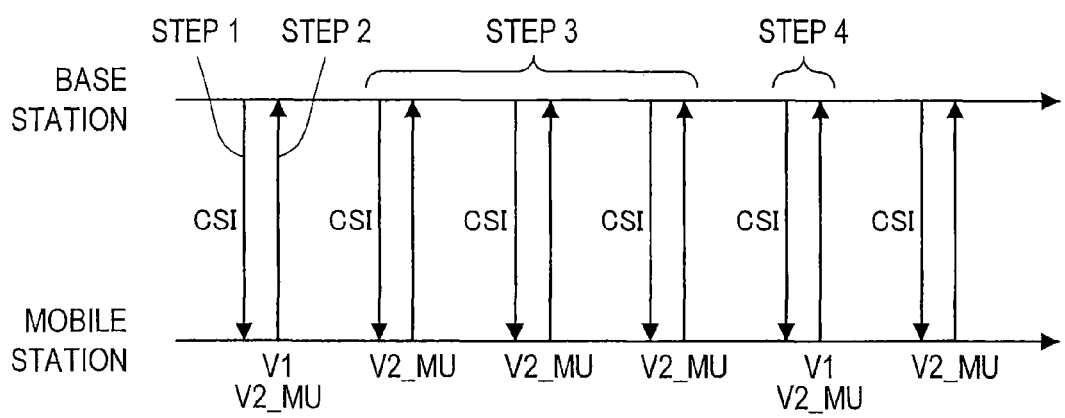
FIG. 4 is an illustrative diagram illustrating a determination method using a comparative example of the transmission weight V1 and transmission weight V2_MU.

FIG. 4 is an illustrative diagram illustrating the determination method using a comparative example of the transmission weight V1 and transmission weight V2_MU. In FIG. 4, the horizontal axis indicates a time. In addition, CSI indicates a channel state information reference signal (CSI_RS).

As illustrated in FIG. 4, the base station transmits a CSI_RS (step 1), and the mobile station obtains a channel matrix H from the CSI_RS received from the base station. In addition, the mobile station evaluates optimal V1 for the obtained channel matrix H, among four types of V1 candidate. For example, the mobile station selects V1 that makes reception power maximum, among four types of V1 candidate. In addition, the mobile station evaluates and selects optimal V2_MU. After that, the mobile station provides feedback of Index_V1 that indicates the selected V1 and Index_V2 that indicates V2_MU to the base station (step 2). The base station determines V1 and V2_MU on the basis of the feedback from the mobile station.

When the base station and the mobile station determines V1 and V2_MU, the base station and the mobile station updates the only V2_MU multiple times (step 3) followed by updating the V1 and V2_MU (step 4). As described above, update frequency of V2_MU is higher than update frequency of V1.

Here, the mobile station performs calculation using a plurality of types of V1 when the mobile station selects V1. As described in "1-2. Transmission weight (V1 and V2)", load of the mobile station in the case of selecting V1 becomes large because load of calculation using V1 is larger than load of calculation using V2_MU.

On the other hand, it is conceived that calculation using V1 is not desired in the case of selecting V2. However, the idea is wrong, and the mobile station performs calculation using V1 in the case of selecting V2. This is because the mobile station obtains a channel matrix H from a newly received CSI_RS, multiplies the channel matrix H by already determined V1, and evaluates optimal V2_MU for the channel matrix H that is multiplied by the V1. As described above, in the determination method of transmission weight using the comparative example, the amount of calculation in the mobile station is increased undesirably because it is desirable that the mobile station performs calculation using V1 in any update of V1 and V2.

Next, a determination method using a comparative example of transmission weight in a case in which MU-MIMO and SU-MIMO are present is described with reference to FIG. 5.

Figure 5:
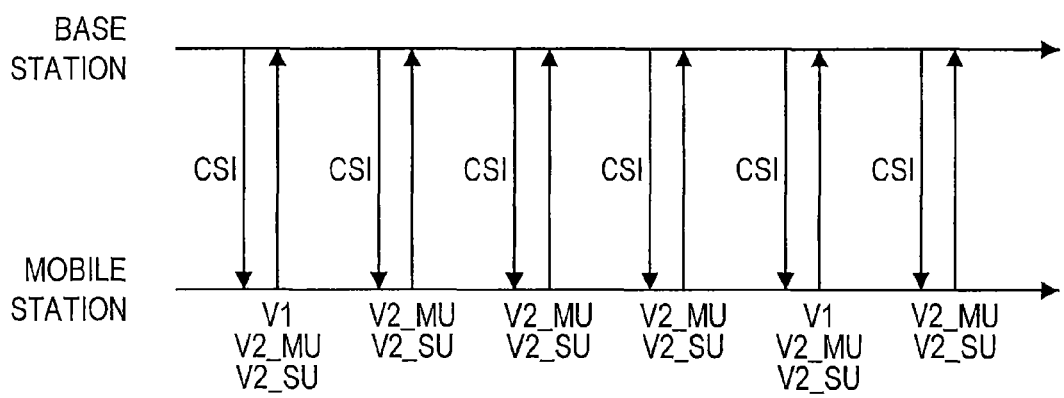
FIG. 5 is an illustrative diagram illustrating a determination method using a comparative example of transmission weight in a case in which MU-MIMO and SU-MIMO are present.

FIG. 5 is an illustrative diagram illustrating the determination method using a comparative example of transmission weight in the case in which MU-MIMO and SU-MIMO are present. As illustrated in FIG. 5, in the case in which MU-MIMO and SU-MIMO are present, the base station and the mobile station updates V2_SU for all a CSI_RS in addition to V1 and V2_MU. Therefore, calculation load in the mobile station is further increased undesirably because the V2_SU is updated. However, in order to realize dynamic switching of MU-MIMO and SU-MIMO, it is important to evaluate both of the V2_MU and V2_SU all the time.

The above-described determination method of transmission weight by a comparative example is summarized as follows:

(1) Calculation Load in the Mobile Station is High

Reason: As described with reference to FIG. 4, calculation using already determined V1 is performed even in the case of evaluating V2_MU.

(2) Calculation Load in the Mobile Station is Further Increase when Dynamic Switching of MU-MIMO and SU-MIMO is Tried to be Realized.

Reason: As described with reference to FIG. 5, both of the V2_MU and V2_SU are evaluated all the time.

In addition, when dynamic switching is performed in a communication system using a plurality of subcarriers of an OFDM modulation scheme, etc., there has been no an allocation method of a frequency subcarrier that can effectively reduce the amount of calculation.

Therefore, the embodiments of the present disclosure have been led to creation by regarding the above circumstances as a point of view. According to each embodiment of the present disclosure, calculation load in the mobile station 20 for determining transmission weight can be suppressed. Each of such embodiments of the present disclosure is described below in detail.

2. BASIC CONFIGURATION OF A BASE STATION

A technology according to the present disclosure can be implemented in various forms as described in detail in "4-1. First embodiment" to "4-7. Seventh embodiment" as examples. In addition, the base station 10 according to each of the embodiments includes:

A: a communication unit (an antenna 110, an analog processing unit 120, etc.) that transmits a reference signal (CSI_RS), B: a first multiplication unit (V1 multiplication unit 154) that performs multiplication of first transmission weight (V1) that is determined on the basis of reception of the reference signal by a communication partner (the mobile station 20), and C: a second multiplication unit (V2_MU multiplication unit 156) that performs multiplication of second transmission weight (V2_MU) that is determined on the basis of reception of the reference signal by the communication partner. In addition, D: the communication unit transmits a reference signal with weight (V1*CSI_RS) obtained by multiplying the reference signal by the first transmission weight after determination of the first transmission weight.

First, a common basic configuration in the base station 10 according to such embodiments is described below with reference to FIGS. 6 to 8.

Figure 6:
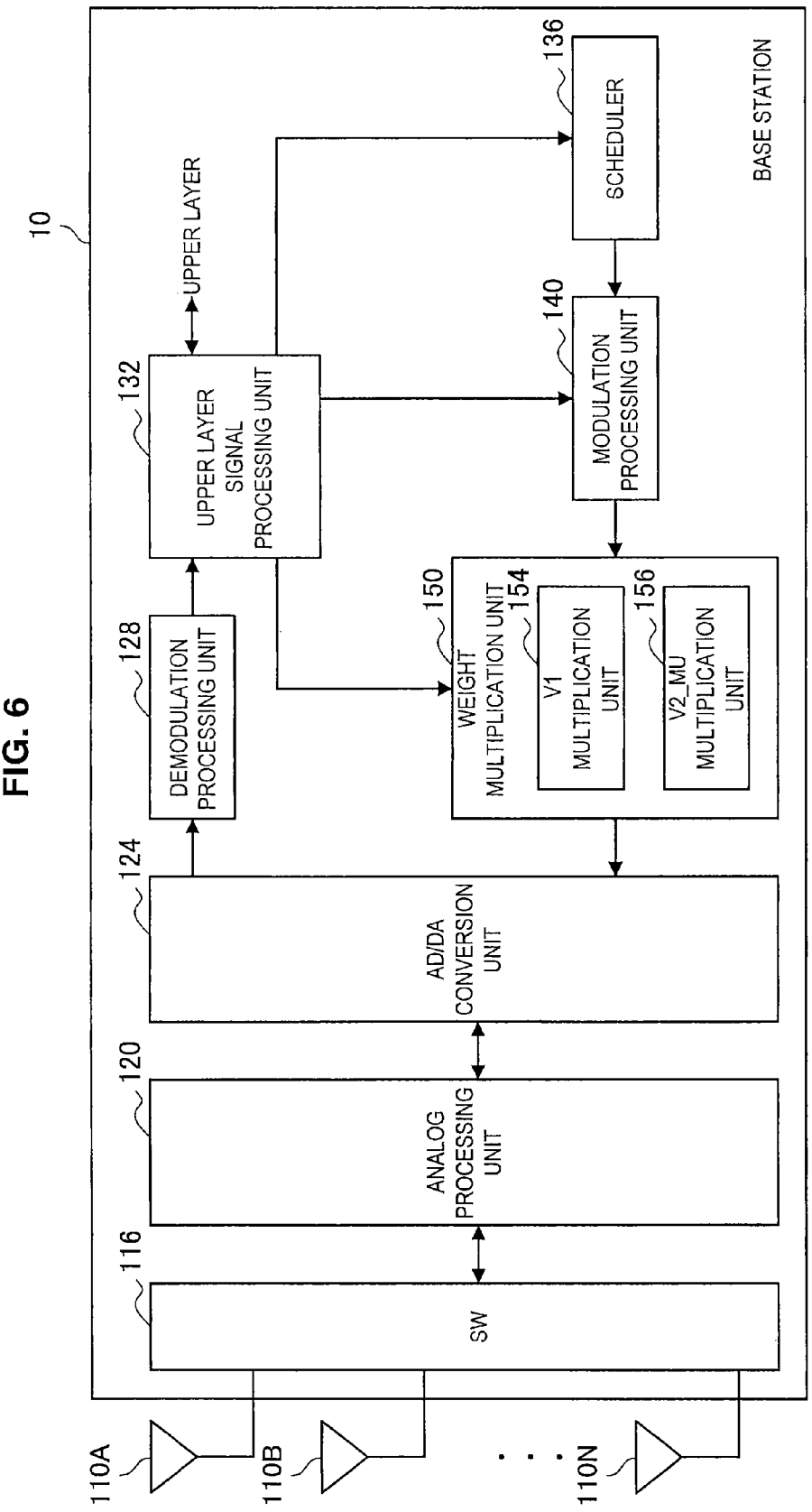
FIG. 6 is an illustrative diagram illustrating a configuration of a base station according to an embodiment of the present disclosure.

FIG. 6 is an illustrative diagram illustrating a configuration of the base station 10 according to the embodiment of the present disclosure. As illustrated in FIG. 6, the base station 10 according to the embodiment of the present disclosure includes the plurality of antennas 110, a switch SW 116, an analog processing unit 120, an AD/DA conversion unit 124, a demodulation processing unit 128, an upper layer signal processing unit 132, a scheduler 136, a modulation processing unit 140, and a weight multiplication unit 150.

The antennas 110A to 110N function as a reception unit that converts a radio signal that is transmitted from the mobile station 20 into an electrical reception signal and supplies the converted signal to the analog processing unit 120, and a transmission unit that converts a transmission signal supplied from the analog processing unit 120 into a radio signal and transmits the converted signal to the mobile station 20. Note that the number of the antennas 110 is not particularly limited, and may be, for example, 8 or 16.

The switch SW 116 is a switch for switching a transmission operation and a reception operation by the base station 10. The base station 10 performs the transmission operation when the antennas 110A to 110N are connected to a transmission circuit of the analog processing unit 120 through the switch SW 116, and performs the reception operation when the antennas 110A to 110N are connected to a reception circuit of the analog processing unit 120 through the switch SW 116.

The analog processing unit 120 includes the transmission circuit that performs analog processing for a transmission signal, and the reception circuit that performs analog processing for a reception signal. In the transmission circuit, for example, up-conversion, filtering, gain control, etc. of a transmission signal, in an analog form, which is supplied from the AD/DA conversion unit 124 are performed. In the reception circuit, for example, down-conversion, filtering, etc. of a reception signal that is supplied from the antenna 110 through the switch SW 116 are performed.

The AD/DA conversion unit 124 performs analogue/digital (AD) conversion of a reception signal that is supplied from the analog processing unit 120, and performs digital/analogue (DA) conversion of a transmission signal that is supplied from the weight multiplication unit 150.

The demodulation processing unit 128 performs demodulation processing of a reception signal that is supplied from the AD/DA conversion unit 124. The demodulation processing that is performed by the demodulation processing unit 128 may include OFDM demodulation processing, MIMO demodulation processing, error correction, etc.

The upper layer signal processing unit 132 performs processing for inputting and outputting transmission data and reception data between the upper layer signal processing unit 132 and an upper layer, control processing of the scheduler 136, the modulation processing unit 140, and the weight multiplication unit 150, determination processing of each transmission weight based on feedback information from the mobile station 20, etc.

In addition, the base station 10 according to the embodiment transmits a V1*CSI_RS (reference signal with weight) obtained by multiplying a CSI_RS by V1 in addition to a CSI_RS (reference signal) after determination of the transmission weight V1 on the basis of feedback information from the mobile station 20 as described later in detail. The upper layer signal processing unit 132 includes a function as a reference signal management unit that manages a resource for transmitting the CSI_RS and a V1*CSI_RS. In addition, the upper layer signal processing unit 132 controls the weight multiplication unit 150 so that transmission of the CSI_RS or V1*CSI_RS is performed in the allocated resource.

The scheduler 136 allocates a resource for data communication to each of the mobile stations 20. The resource that is allocated by the scheduler 136 is reported to each of the mobile stations 20 by a control channel, and each of the mobile stations 20 performs data communication in uplink or downlink using the reported resource.

The modulation processing unit 140 performs modulation processing such as mapping based on a constellation on transmission data that is supplied from the upper layer signal processing unit 132. The transmission signal obtained after modulation by the modulation processing unit 140 is supplied to the weight multiplication unit 150.

The weight multiplication unit 150 multiplies the transmission signal that is supplied from the modulation processing unit 140 by the transmission weight V1 and transmission weight V2_MU that are determined by the upper layer signal processing unit 132 at the time of execution of MU-MIMO. On the other hand, the weight multiplication unit 150 multiplies the transmission signal that is supplied from the modulation processing unit 140 by the transmission weight V2_SU that is determined by the upper layer signal processing unit 132 at the time of execution of SU-MIMO. In addition, the weight multiplication unit 150 multiplies a CSI_RS by V1 in a resource that is allocated for transmission of a V1*CSI_RS (the "*" is complex multiplication) by the upper layer signal processing unit 132. Such configuration of the weight multiplication unit 150 is described below in more detail with reference to FIG. 7.

Figure 7:
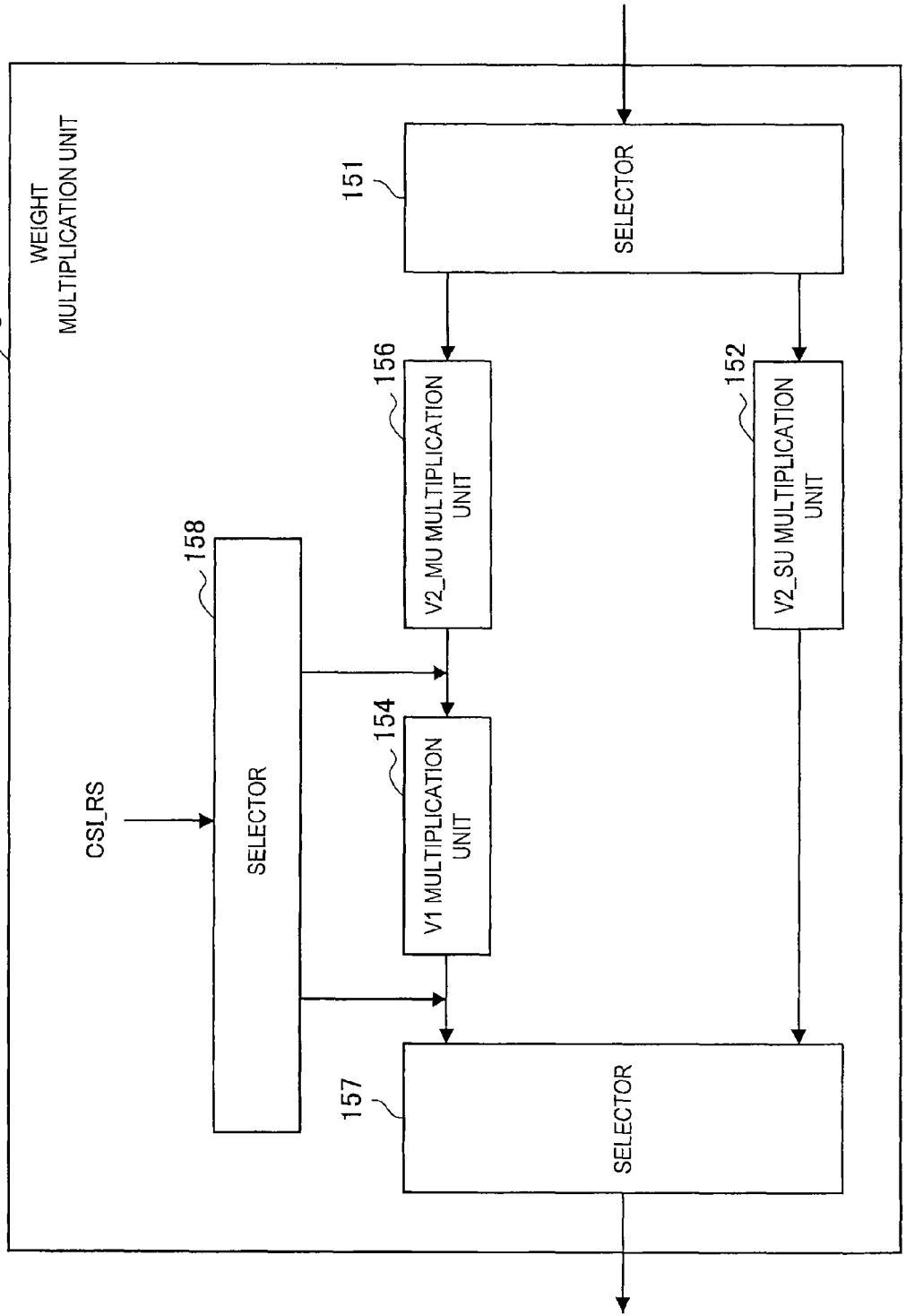
FIG. 7 is an illustrative diagram illustrating of a configuration of a weight multiplication unit.

FIG. 7 is an illustrative diagram illustrating a configuration of the weight multiplication unit 150. As illustrated in FIG. 7, the weight multiplication unit 150 includes selectors 151, 157, and 158, a V2_SU multiplication unit 152, the V1 multiplication unit 154, and the V2_MU multiplication unit 156.

The selector 151 supplies a transmission signal that is supplied from the modulation processing unit 140 to the V2_MU multiplication unit 156 or the V2_SU multiplication unit 152. More specifically, the selector 151 supplies a transmission signal to the V2_MU multiplication unit 156 when setting of MIMO is MU-MIMO, and supplies a transmission signal to the V2_SU multiplication unit 152 when setting of MIMO is SU-MIMO.

The V2_SU multiplication unit 152 multiplies the transmission signal that is supplied from the selector 151 by V2_SU that is determined by the upper layer signal processing unit 132.

On the other hand, the V2_MU multiplication unit 156 multiplies the transmission signal that is supplied from the selector 151 by V2_MU that is determined by the upper layer signal processing unit 132. In addition, the V1 multiplication unit 154 multiplies the transmission signal that is multiplied by the V2_MU, by V1.

The selector 157 selectively outputs the multiplication result by the V1 multiplication unit 154, or the multiplication result by the V2_SU multiplication unit 152. More specifically, the selector 157 outputs the multiplication result by the V1 multiplication unit 154 when setting of MIMO is MU-MIMO and outputs the multiplication result by the V2_SU multiplication unit 152 when setting of MIMO is SU-MIMO.

A selector 158 supplies a CSI_RS to the former part or the latter part of the V1 multiplication unit 154. More specifically, the selector 158 supplies a CSI_RS to the latter part of the V1 multiplication unit 154 in a resource that is allocated for transmitting the CSI_RS. In this case, the base station 10 transmits a CSI_RS that is not multiplied by V1.

On the other hand, the selector 158 supplies a CSI_RS to the former part of the V1 multiplication unit 154 in a resource that is allocated for transmitting a V1*CSI_RS. In this case, the base station 10 transmits a V1*CSI_RS because the CSI_RS is multiplied by V1 in the V1 multiplication unit 154.

Note that, in FIG. 7, the example is described in which the V1 multiplication unit 154 is arranged in the latter part of the V2 multiplication unit 156, however, the configuration of the weight multiplication unit 150 is not limited to such example. For example, as described below with reference to FIG. 8, the V1 multiplication unit 154 may be arranged in the former part of the V2 multiplication unit 156.

Figure 8:
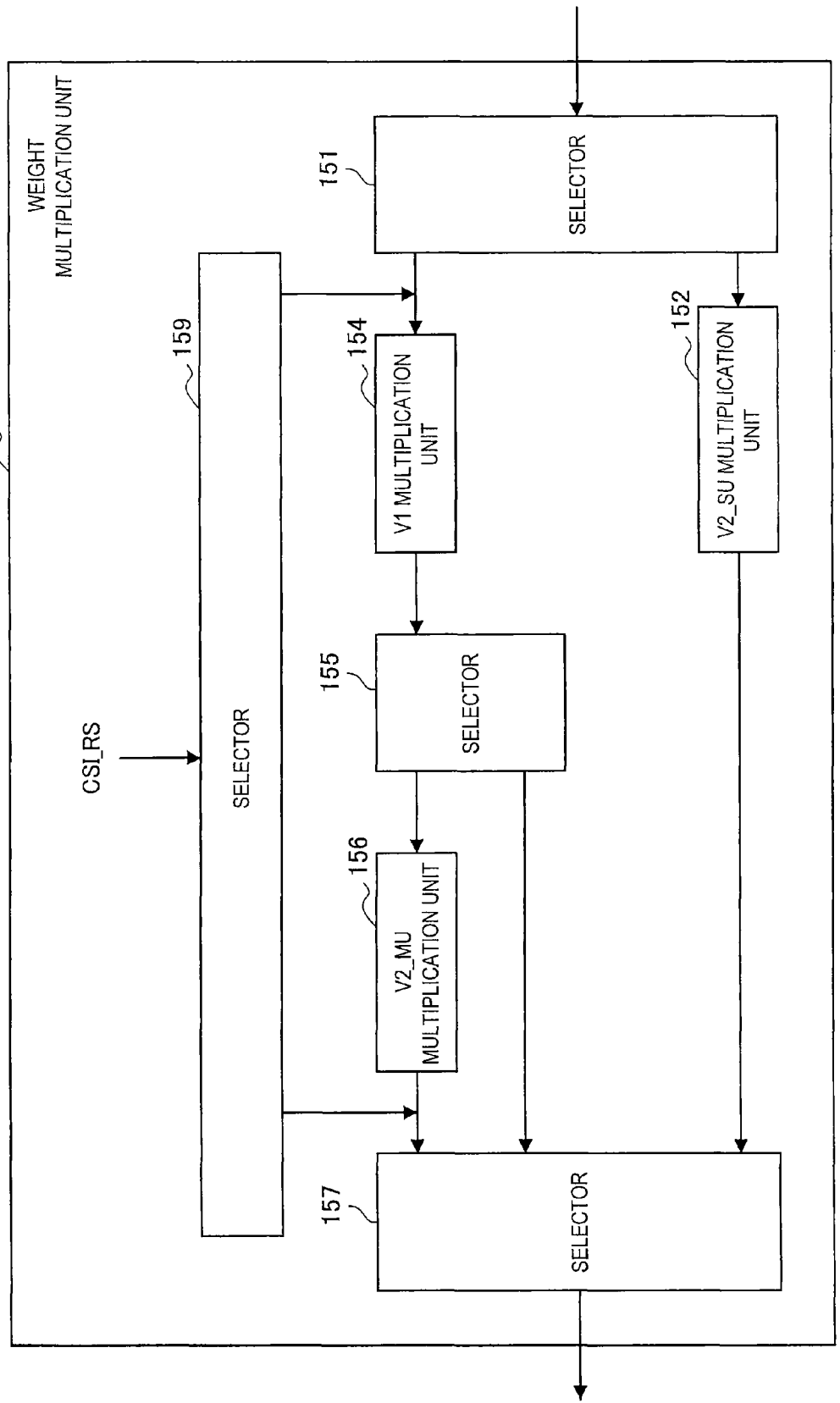
FIG. 8 is an illustrative diagram illustrating a configuration of a weight multiplication unit according to a variant.

FIG. 8 is an illustrative diagram illustrating a configuration of a weight multiplication unit 150' according to a variant. As illustrated in FIG. 8, the weight multiplication unit 150' according to the variant includes the selectors 151, 155, 157, and 159, the V2_SU multiplication unit 152, the V1 multiplication unit 154, and the V2_MU multiplication unit 156.

In the weight multiplication unit 150' according to the variant, as illustrated in FIG. 8, the V1 multiplication unit 154 is arranged in the former part of the V2_MU multiplication unit 156. In addition, in the weight multiplication unit 150' according to the variant, the selector 159 supplies a CSI_RS to the former part of the V1 multiplication unit 154 or the latter part of the V2_MU multiplication unit 156.

More specifically, the selector 159 supplies a CSI_RS to the latter part of the V2_MU multiplication unit 156 in a resource that is allocated for transmitting a CSI_RS. In this case, the base station 10 transmits a CSI_RS that is not multiplied by V1.

On the other hand, the selector 159 supplies a CSI_RS to the former part of the V1 multiplication unit 154 in a resource that is allocated for transmitting a V1*CSI_RS. In this case, the CSI_RS is multiplied by V1 in the V1 multiplication unit 154, and the V1*CSI_RS that is the multiplication result is supplied from the selector 155 to the selector 157 so as to bypass the V2_MU multiplication unit 156. As a result, the base station 10 transmits the V1*CSI_RS.

As described above, the base station 10 according to the embodiment starts to transmit a V1*CSI_RS after determination of transmission weight V1. By such configuration, calculation load of V2_MU, etc. in the mobile station 20 that is described below can be suppressed.

3. BASIC CONFIGURATION OF A MOBILE STATION

Figure 9:
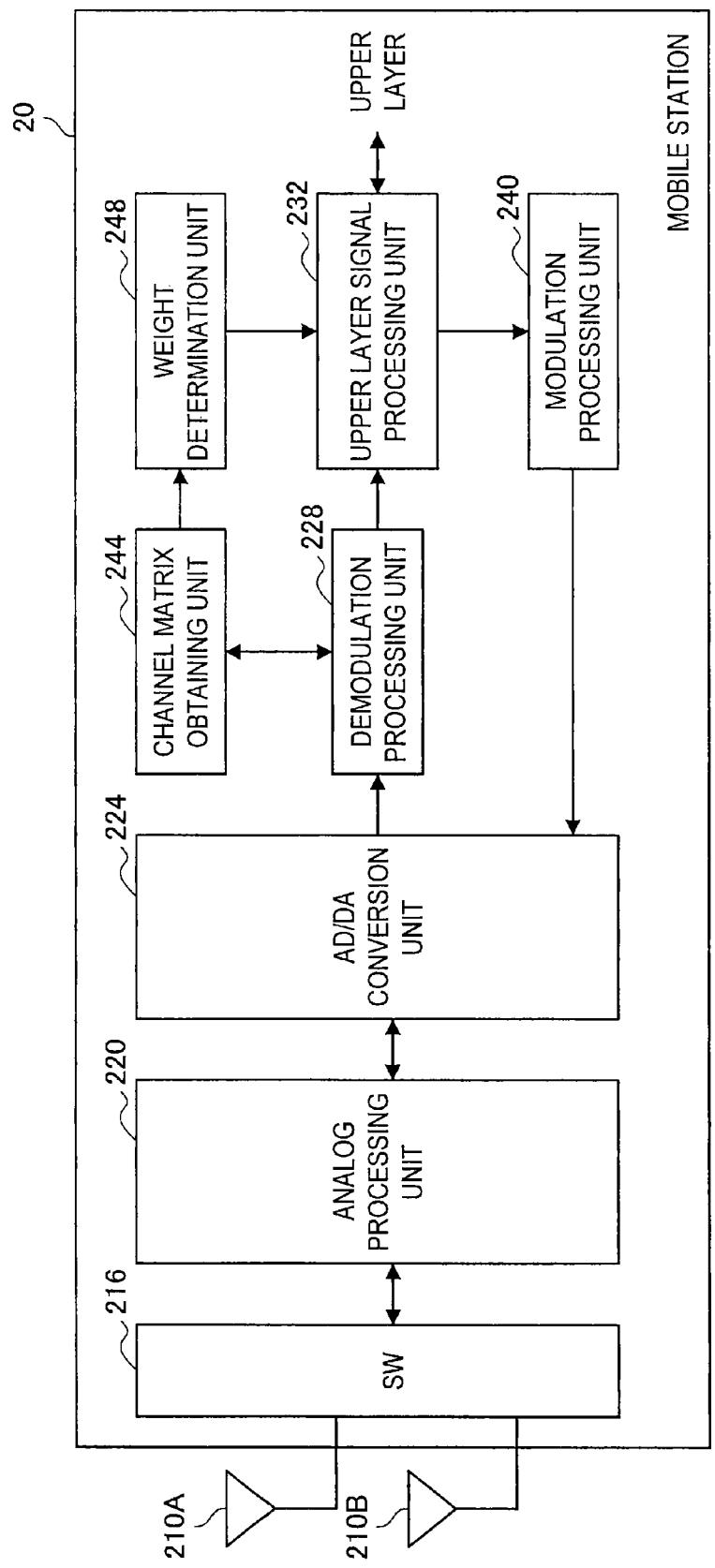
FIG. 9 is an illustrative diagram illustrating a configuration of a mobile station according to an embodiment.

FIG. 9 is an illustrative diagram illustrating a configuration of the mobile station 20 according to the embodiment. As illustrated in FIG. 9, the mobile station 20 according to the embodiments includes a plurality of antennas 210, a switch SW 216, an analog processing unit 220, an AD/DA conversion unit 224, a demodulation processing unit 228, an upper layer signal processing unit 232, a modulation processing unit 240, a channel matrix obtaining unit 244, and a weight determination unit 248.

The antennas 210A and 210B function as a reception unit that converts a radio signal that is transmitted from the base station 10 into an electrical reception signal and supplies the converted signal to the analog processing unit 220, and function as transmission unit that converts a transmission signal that is supplied from the analog processing unit 220 into a radio signal and transmits the converted signal to the base station 10. Note that the number of antennas 210 is not limited, and for example, may be four, or eight.

The switch SW 216 is a switch for switching a transmission operation and a reception operation of the mobile station 20. The mobile station 20 performs the transmission operation when the antennas 210A and 210B are connected to a transmission circuit of the analog processing unit 220 through the switch SW 216, and the mobile station 20 performs the reception operation when the antennas 210A and 210B are connected to a reception circuit of the analog processing unit 220 through the switch SW 216.

The analog processing unit 220 includes a transmission circuit that performs analog processing on a transmission signal and a reception circuit that performs analog processing on a reception signal. In the transmission circuit, for example, up-conversion, filtering, gain control, etc. of a transmission signal in an analog form, which is supplied from the AD/DA conversion unit 224 are performed. In the reception circuit, for example, down-conversion, filtering, etc. of a reception signal that is supplied from the antenna 210 through the switch SW 216 are performed.

The AD/DA conversion unit 224 performs AD conversion of a reception signal that is supplied from the analog processing unit 220 and performs DA conversion of a transmission signal that is supplied from the modulation processing unit 240.

The demodulation processing unit 228 performs demodulation processing of a reception signal that is supplied from the AD/DA conversion unit 224. The demodulation processing that is performed by the demodulation processing unit 228 may include OFDM demodulation processing, MIMO demodulation processing, and error correction.

The upper layer signal processing unit 232 performs processing for inputting and outputting transmission data and reception data between the upper layer signal processing unit 232 and an upper layer. In addition, the upper layer signal processing unit 232 supplies feedback information that indicates transmission weight that is determined by the weight determination unit 248 to the modulation processing unit 240, as transmission data.

The modulation processing unit 240 performs modulation processing such as mapping based on a constellation on transmission data that is supplied from the upper layer signal processing unit 232. The transmission signal obtained after modulation by the modulation processing unit 240 is supplied to the AD/DA conversion unit 224.

The channel matrix obtaining unit 244 obtains a channel matrix H between the base station 10 and the mobile station 20 when a CSI_RS is received from the base station 10.

The weight determination unit 248 determines transmission weight of V1, V2_MU, V2_SU, etc. on the basis of the channel matrix H obtained by the channel matrix obtaining unit 244. Here, as described above with reference to FIG. 4, when V2_MU is updated on the basis of the channel matrix H obtained from the CSI_RS, the mobile station according to a comparative example multiplies the channel matrix H by already determined V1 and evaluates optimal V2_MU for the channel matrix H that is multiplied by the V1. Therefore, in the mobile station according to the comparative example, calculation using V1 is performed even at the time of update of V2_MU.

On the contrary, in the embodiment, after determination of V1, V1*CSI_RS that is a CSI_RS multiplied by the V1 is received from the base station 10. A channel matrix H that is obtained from a V1*CSI_RS by the channel matrix obtaining unit 244 is already in a form of being multiplied by V1. Thus, the weight determination unit 248 can update V2_MU on the basis of the channel matrix H that is obtained from the V1*CSI_RS without performing calculation using V1. As a result, calculation load in the mobile station 20 for update of V2_MU can be significantly reduced.

4. DESCRIPTION OF EACH OF THE EMBODIMENTS

The basic configurations of the base station 10 and the mobile station 20 according to each of the embodiments of the present disclosure are described above. Next, each of the embodiments of the present disclosure is described in detail.

4-1. First Embodiment

Figure 10:
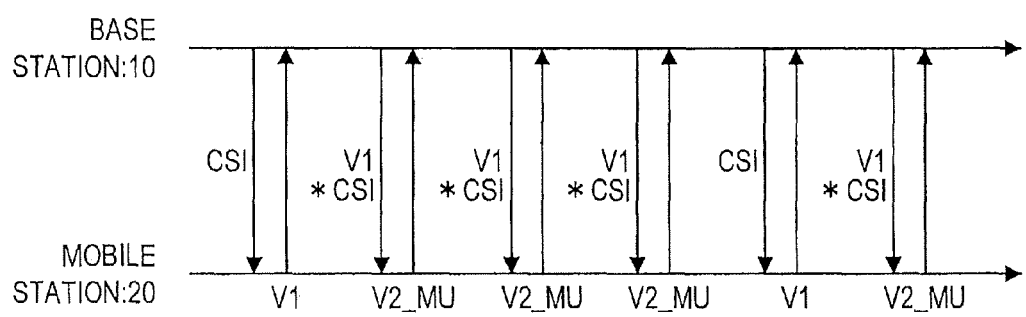
FIG. 10 is an illustrative diagram illustrating a first embodiment of the present disclosure.

FIG. 10 is an illustrative diagram illustrating a first embodiment of the present disclosure. As illustrated in FIG. 10, the base station 10 transmits a V1*CSI_RS to update (determine) V2_MU when V1 is determined after transmitting a CSI_RS. As described above, the mobile station 20 that has received a V1*CSI_RS can evaluate optimal V2_MU without performing calculation using V1.

In addition, the base station 10 transmits a CSI_RS to update V1 after transmitting a V1*CSI_RS multiple times. After that, the base station 10 transmits a V1*CSI_RS to update V2_MU.

In FIG. 10, an example is described in which the update frequency of V2 is about 4 to 5 times the update frequency of V1, however relationship of update frequency is not limited to the example. In practice, it is conceivable that the update frequency of V1 is more than 10 times the update frequency of V2.

4-2. Second Embodiment

As described in the first embodiment, when the base station 10 transmits a V1*CSI_RS, the mobile station 20 can evaluate optimal V2_MU without calculation using V1. Here, in order to realize dynamic switching of MU-MIMO and SU-MIMO, it is desirable that the mobile station 20 obtains V2_SU. However, it is difficult for the mobile station 20 to evaluate V2_SU from the V1*CSI_RS.

Therefore, the upper layer signal processing unit 132 of the base station 10 according to a second embodiment allocates a resource for transmitting a CSI_RS to update (determine) V2_SU in addition to allocation of a resource for transmitting a V1*CSI_RS to update (determine) V2_MU. An operation of the base station 10 according to such second embodiment is described in detail with reference to FIG. 11.

Figure 11:
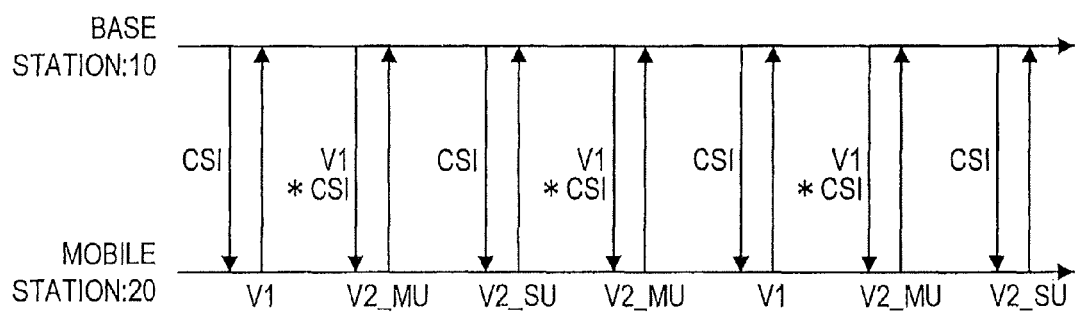
FIG. 11 is an illustrative diagram illustrating a second embodiment of the present disclosure.

FIG. 11 is an illustrative diagram illustrating the second embodiment of the present disclosure. As illustrated in FIG. 11, the base station 10 according to the second embodiment transmits a V1*CSI_RS to update V2_MU after determination of V1, and transmits a CSI_RS to update (determine) V2_SU. By such configuration, the dynamic switching of MU-MIMO and SU-MIMO can be realized because V2_MU is obtained on the basis of the V1*CSI_RS and V2_SU is obtained on the basis of the CSI_RS.

Note that the mobile station 20 can determines that a radio signal that is received from the base station 10 is a CSI_RS or a V1*CSI_RS, for example, by a method that is described below.

(1) The base station 10 reports timing, order, etc. of transmission of a CSI_RS or a V1*CSI_RS through RRC signaling beforehand, to the mobile station 20.

(2) The base station 10 reports timing, order, etc. of transmission of a CSI_RS or a V1*CSI_RS to the mobile station 20 by broadcasting system information.

(3) The base station 10 transmits a CSI_RS and a V1*CSI_RS after performing addition of identification information that indicates a CSI_RS or a V1*CSI_RS.

4-3. Third Embodiment

As described in "1-4. Dynamic switching", in SU-MIMO, for example, MIMO transmission of eight independent streams is performed. On the other hand, in MU-MIMO, for example, MIMO transmission of two independent streams is performed for each of the four different mobile stations 20. Thus, V2_SU and V2_MU are different in terms that V2_SU is used for eight streams and V2_MU is used for two streams.

In this case, it is effective to set update frequency of V2_SU higher than update frequency of V2_MU because higher accuracy is desired for V2_SU that is used for eight streams.

Therefore, the upper layer signal processing unit 132 of the base station 10 according to a third embodiment allocates more resources for transmitting a CSI_RS to update (determine) V2_SU than that for transmitting of a V1*CSI_RS to update (determine) V2_MU. An operation of the base station 10 according to such third embodiment is described in detail with reference to FIG. 12.

Figure 12:
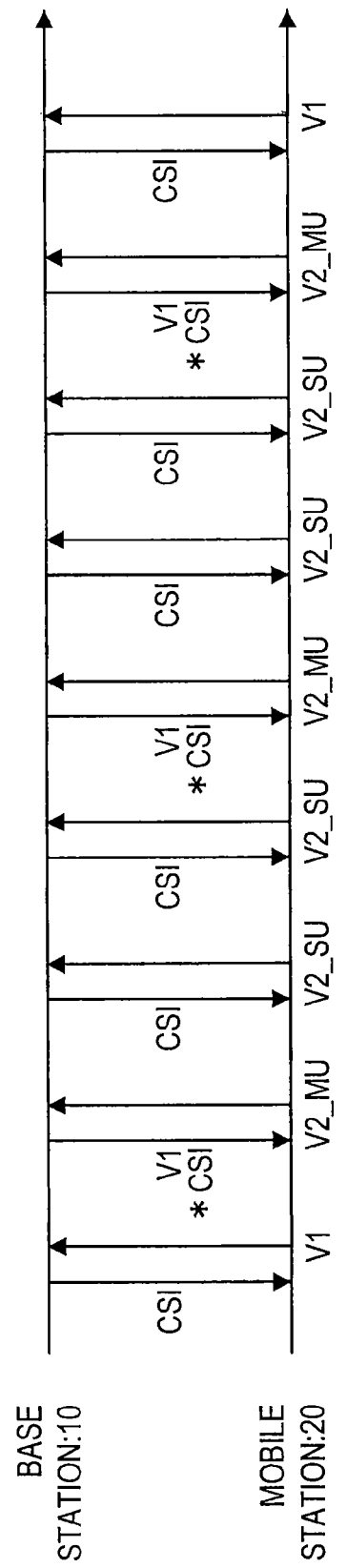
FIG. 12 is an illustrative diagram illustrating a third embodiment of the present disclosure.

FIG. 12 is an illustrative diagram illustrating the third embodiment of the present disclosure. As illustrated in FIG. 12, the base station 10 according to the third embodiment transmits, on a time direction, a CSI_RS to update (determines) V2_SU at higher frequency than that of a V1*CSI_RS to update (determines) V2_MU after determination of V1. By such configuration, highly accurate V2_SU can be obtained while suppressing calculation load in the mobile station 20 at the time of update of V2_MU.

4-4. Fourth Embodiment

In the third embodiment, the description is made in which the base station 10 transmits, in the time direction, a CSI_RS at higher frequency than that of a V1*CSI_RS in order to make the update frequency of V2_SU higher than the update frequency of V2_MU. In a fourth embodiment, similarly to the third embodiment, arrangement of a V1*CSI_RS and a CSI_RS on the frequency direction in a subcarrier of OFDM has been devised in order to make the update frequency of V2_SU higher than the update frequency of V2_MU. A resource allocation example according to the fourth embodiment is described below in detail with reference to FIG. 13.

Figure 13:
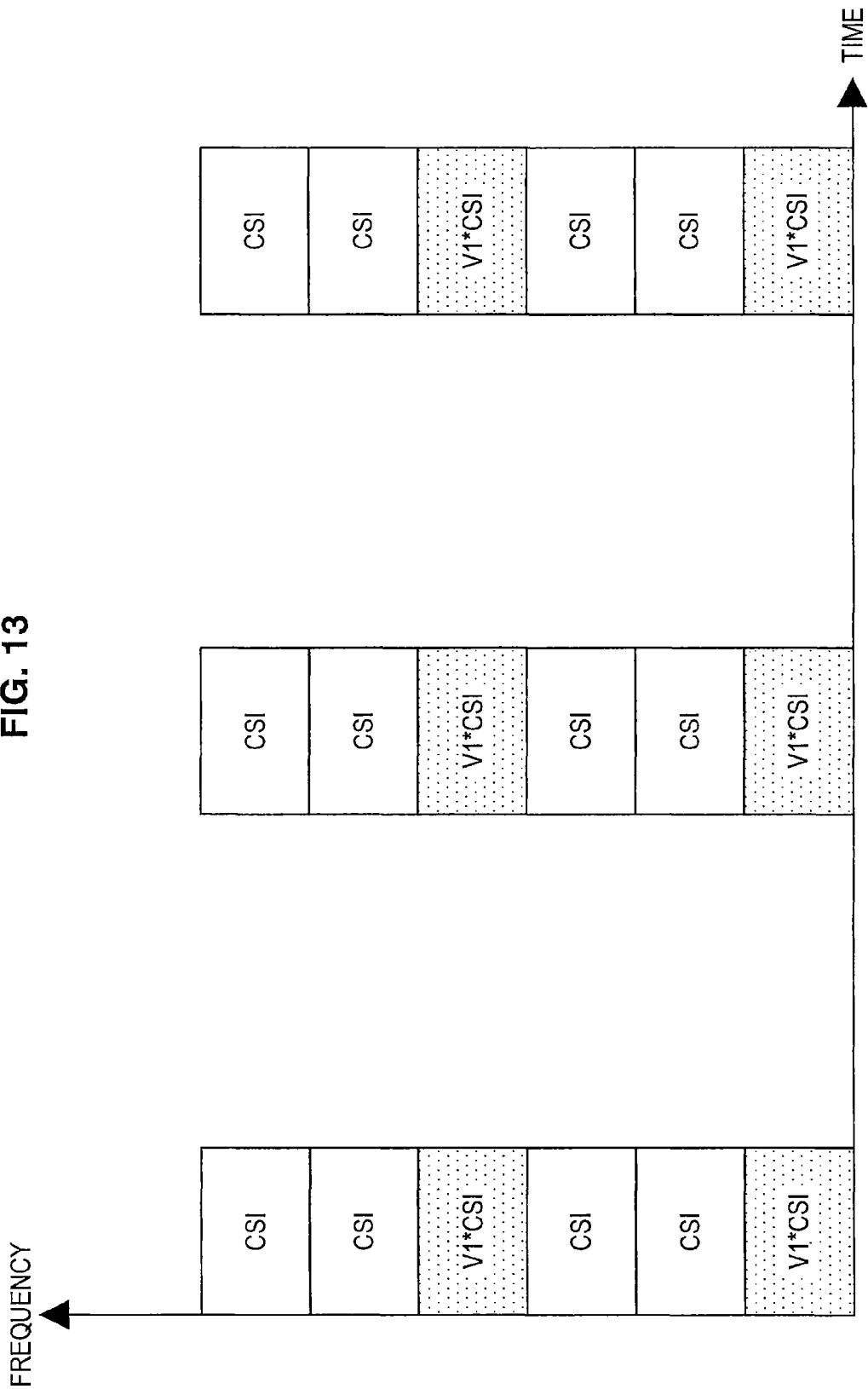
FIG. 13 is an illustrative diagram illustrating a resource allocation example of a V1*CSI_RS and a CSI_RS according to a fourth embodiment.

FIG. 13 is an illustrative diagram illustrating a resource allocation example of a V1*CSI_RS and a CSI_RS according to the fourth embodiment. As illustrated in FIG. 13, the upper layer signal processing unit 132 of the base station 10 according to fourth embodiment arranges, on the frequency direction, a CSI_RS more densely than a V1*CSI_RS. As described above, similarly to the third embodiment, highly accurate V2_SU can be obtained while suppressing calculation load in the mobile station 20 at the time of update of V2_MU, by devising the arrangement of a V1*CSI_RS and a CSI_RS on the frequency direction.

4-5. Fifth Embodiment

In a fifth embodiment, resource allocation for data communication using a determined transmission weight is described.

Figure 14:
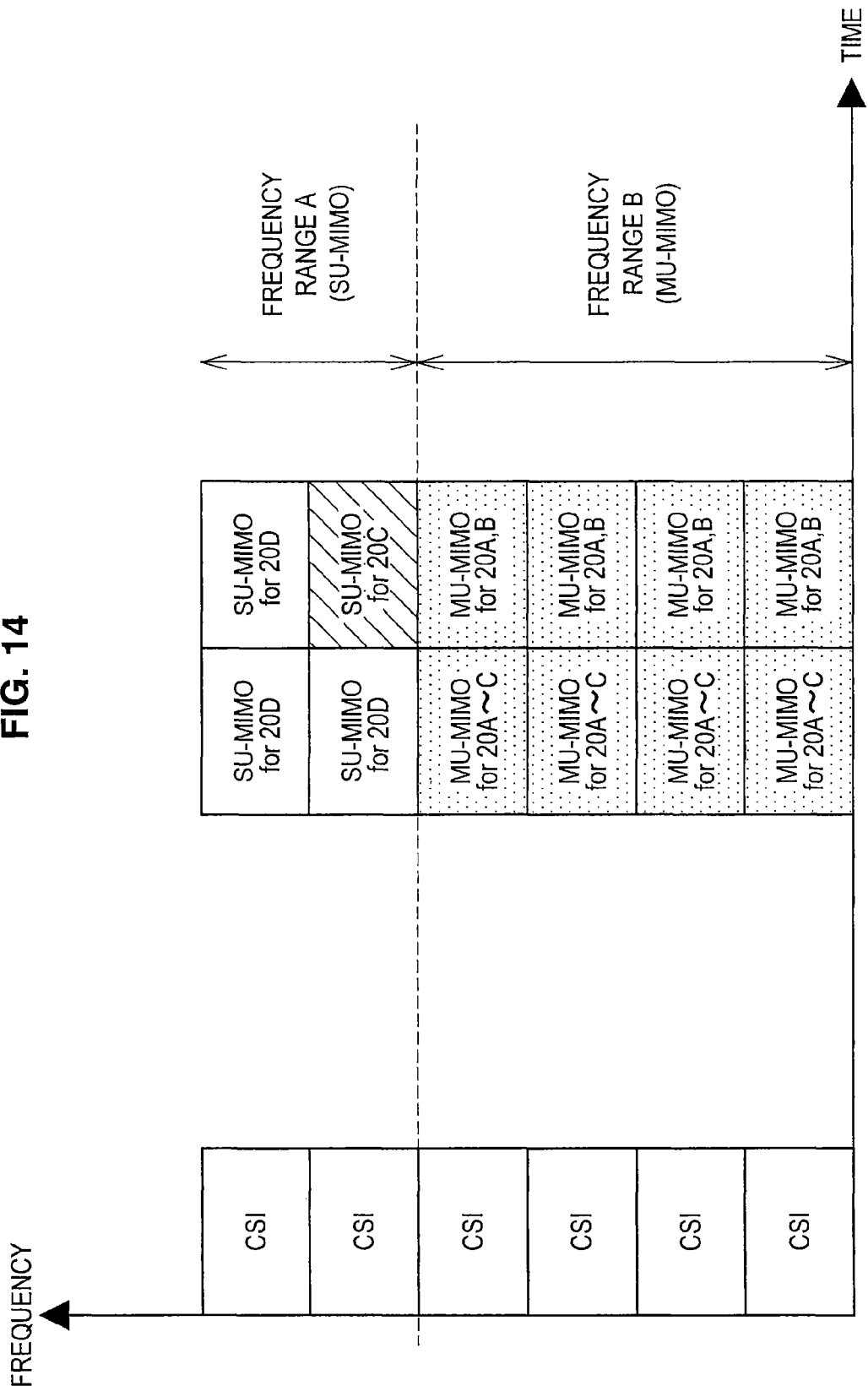
FIG. 14 is an illustrative diagram illustrating a specific example of resource allocation according to a fifth embodiment.

FIG. 14 is an illustrative diagram illustrating a specific example of resource allocation according to the fifth embodiment. The horizontal axis in FIG. 14 indicates a time, and the vertical axis indicates a frequency. In addition, the time width of a square block in FIG. 14 may be one resource block or one subframe. In addition, the frequency width of the square block may be one resource block (12 subcarrier portions) or another band width.

As illustrated in FIG. 14, when the base station 10 transmits a CSI_RS first, the mobile station 20 obtains V1, V2_MU, and V2_SU for each frequency on the basis of the reception of a CSI_RS. In addition, the mobile station 20 provides feedback of V1, V2_MU, and V2_SU to the base station 10.

After that, as illustrated in FIG. 14, the scheduler 136 of the base station 10 allocates four resource blocks from the bottom included in a frequency range B for MU-MIMO (first scheme) with the mobile stations 20A to 20C. On the other hand, as illustrated in FIG. 14, the scheduler 136 of the base station 10 allocates two resource blocks from the top included in a frequency range A for SU-MIMO (second scheme) with the mobile station 20D.

Here, the scheduler 136 according to the fifth embodiment keeps the resource blocks that are included in the frequency range B as an area for MU-MIMO and keeps the resource blocks that are included in the frequency range A as an area for SU-MIMO.

Therefore, for example, when the scheduler 136 according to the fifth embodiment performs dynamic switching of setting of MIMO of the mobile station 20C from MU-MIMO to SU-MIMO, the resource block that is allocated to the mobile station 20C is moved to the resource block that is included in the frequency range A, as illustrated in FIG. 14.

As described above, according to the fifth embodiment, dynamic switching of MU-MIMO and SU-MIMO can be realized by moving a resource block of the mobile station 20 in a frequency direction.

4-6. Sixth Embodiment

Figure 15:
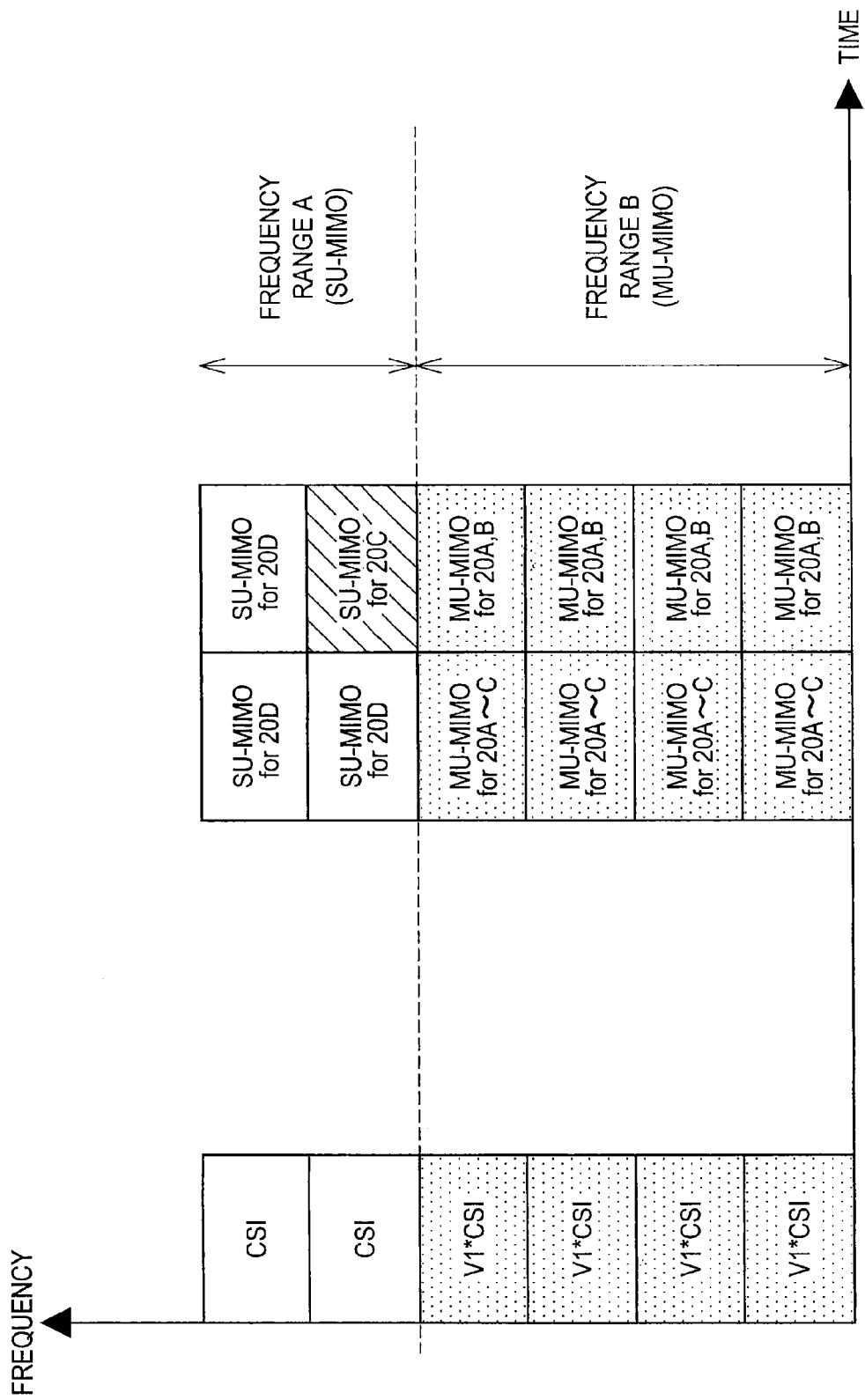
FIG. 15 is an illustrative diagram illustrating a specific example of resource allocation according to a sixth embodiment.

FIG. 15 is an illustrative diagram illustrating a specific example of resource allocation according to a sixth embodiment. As illustrated in FIG. 15, the upper layer signal processing unit 132 according to the sixth embodiment allocates resource blocks that are included in the frequency range B for MU-MIMO that is described in the fifth embodiment, for transmitting a V1*CSI_RS, after determination of V1. In addition, the upper layer signal processing unit 132 allocates resource blocks that are included in the frequency range A for SU-MIMO that is described in the fifth embodiment, for transmitting a CSI_RS.

By such configuration, V2_SU can be updated in frequency range A while suppressing the amount of calculation in the mobile station 20 and updating V2_MU in the frequency range B. Therefore, the frequency range B can be used for communication by MU-MIMO, and the frequency range A can be used for communication by SU-MIMO.

4-7. Seventh Embodiment

In the above-described fifth embodiment and sixth embodiment, the example is described in which a frequency range for MU-MIMO and a frequency range for SU-MIMO are fixed, and alternatively, as described below with reference to a seventh embodiment, a frequency range for MU-MIMO and a frequency range for SU-MIMO can be dynamically changed.

Figure 16:
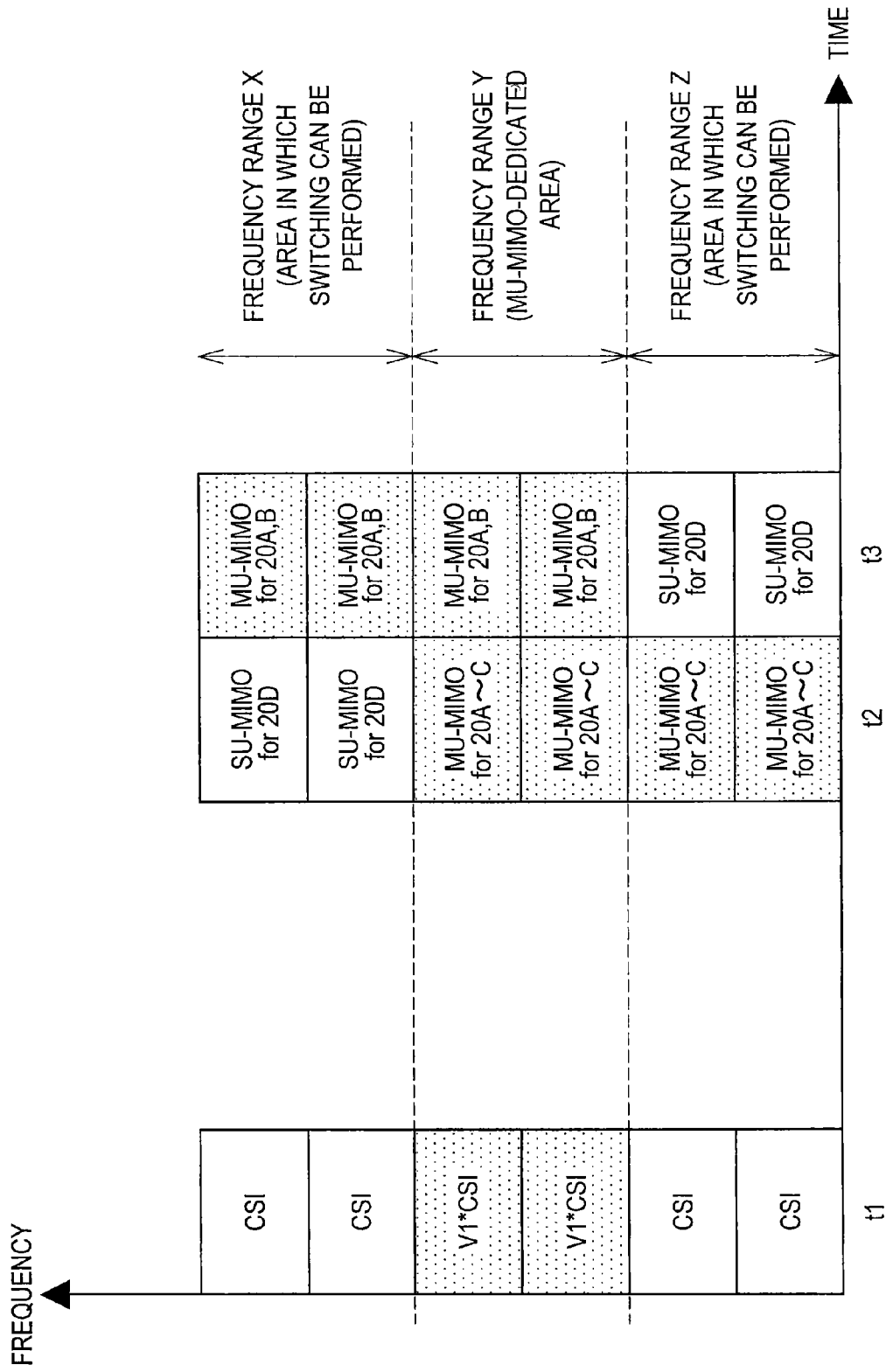
FIG. 16 is an illustrative diagram illustrating a specific example of resource allocation according to a seventh embodiment.

FIG. 16 is an illustrative diagram illustrating a specific example of resource allocation according to a seventh embodiment. As illustrated in FIG. 16, it is assumed that, in the time t1, resource blocks in a frequency range Z and a frequency range X are allocated for transmitting a CSI_RS, resource blocks in a frequency range Y are allocated for transmission of a V1*CSI_RS.

Here, in a frequency in which a CSI_RS is transmitted, V1, V2_MU, and V2_SU can be obtained. On the other hand, in a frequency in which a V1*CSI_RS is transmitted, V2_MU can be obtained, however, V2_SU is difficult to be obtained. That is, the frequency in which a V1*CSI_RS is transmitted can be used for MU-MIMO, the frequency in which a CSI_RS is transmitted can be used for both of MU-MIMO or SU-MIMO.

Therefore, the scheduler 136 according to the seventh embodiment handles resource blocks in the frequency range X and the frequency range Z to which a CSI_RS is transmitted as an area in which switching of SU-MIMO and MU-MIMO can be performed. On the other hand, the scheduler 136 handles resource blocks in the frequency range Y to which a V1*CSI_RS is transmitted as a MU-MIMO-dedicated area.

For example, as illustrated in FIG. 16, at the time t2, the scheduler 136 allocates resource blocks in the frequency range X for communication by SU-MIMO, and allocates resource blocks in the frequency range Y and the frequency Z for communication by MU-MIMO. After that, at the time t3, the scheduler 136 can switches resource blocks for MU-MIMO to resource blocks for SU-MIMO in the frequency range Z, and can switches at resource blocks for SU-MIMO to at resource blocks for MU-MIMO in the frequency range X.

5. OPERATION OF THE BASE STATION AND THE MOBILE STATION

Each of the embodiments of the present disclosure is described above. Next, operations of the base station 10 and the mobile station 20 according to the embodiments of the present disclosure are described with reference to FIGS. 17 and 18.

Figure 17:
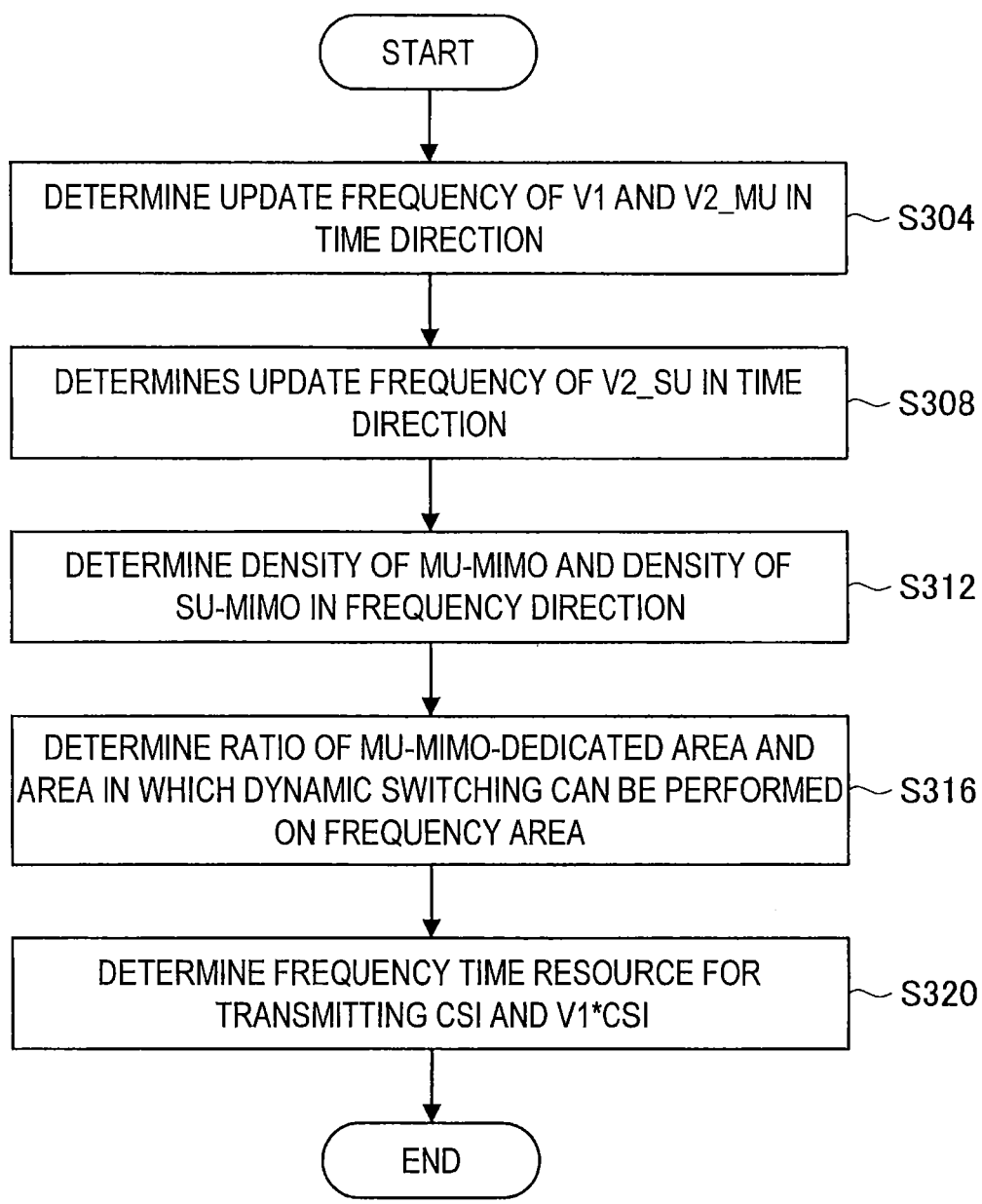
FIG. 17 is a flowchart illustrating an operation of a base station according to the embodiments of the present disclosure.

FIG. 17 is a flowchart illustrating an operation of the base station 10 according to the embodiments of the present disclosure. Note that FIG. 17 particularly corresponds to the operation of the base station 10 according to the seventh embodiment.

As illustrated in FIG. 17, first, the base station 10 determines update frequency of V1 and update frequency of V2_MU in the time direction (S304). After that, the base station 10 determines update frequency of V2_SU in the time direction (S308).

After that, the base station 10 determines a density of a resource for MU-MIMO and a density of a resource for SU-MIMO in the frequency direction (S312). In addition, the base station 10 determines a ratio, which is illustrated in FIG. 16, of the MU-MIMO-dedicated area and the area in which dynamic switching can be performed in the frequency direction (S316). Note that in the example illustrated in FIG. 16, the ratio of the MU-MIMO-dedicated area and the in which dynamic switching can be performed in the frequency direction is 1:2, and a density ratio of a resource for MU-MIMO and a resource for SU-MIMO in the frequency direction is 2:1.

After that, the base station 10 allocates a resource for transmitting a CSI_RS and a resource for transmitting a V1*CSI_RS (S320). More specifically, in S316, the base station 10 allocates a resource of a frequency that is determined as the MU-MIMO-dedicated area for transmitting a V1*CSI_RS and allocates a resource of a frequency that is determined as the area in which dynamic switching can be performed for transmitting a CSI_RS. In addition, the base station 10 allocates a resource in the time direction to a V1*CSI_RS and a CSI_RS on the basis of the determination results of S304 and S308. In addition, the base station 10 transmits a CSI_RS and a V1*CSI_RS in accordance with the determined resource.

Figure 18:
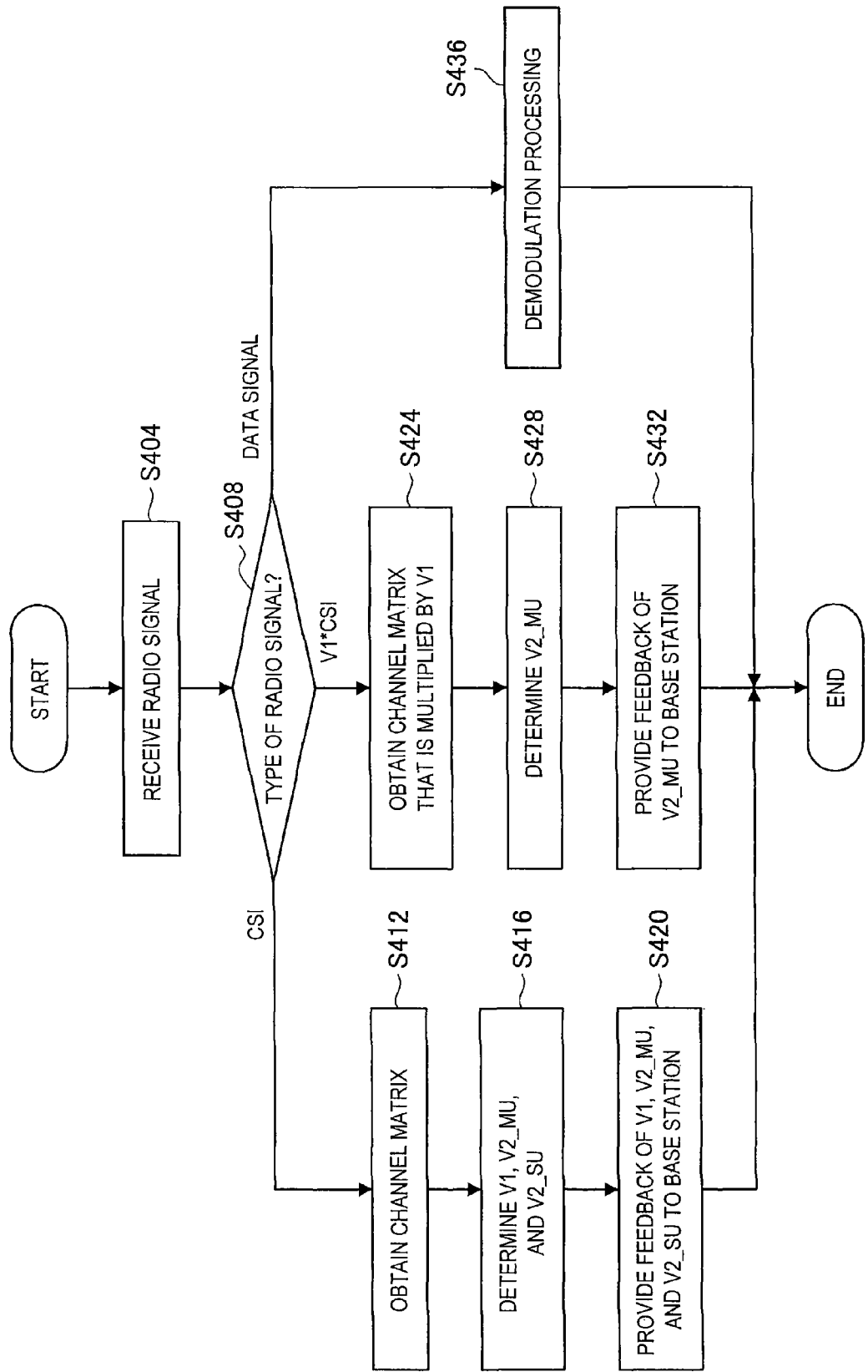
FIG. 18 is a flowchart illustrating an operation of a mobile station according to the embodiments of the present disclosure.

FIG. 18 is a flowchart of an operation of the mobile station 20 according to the embodiments. As illustrated in FIG. 18, in a case in which the mobile station 20 receives a radio signal from the base station 10 (S404), when the radio signal is a CSI_RS (S408), a channel matrix H is obtained from the reception result of the CSI_RS (S412). In addition, the mobile station 20 determines transmission weight such as V1, V2_MU, and V2_SU on the basis of the channel matrix H obtained in S412 (S416). In addition, the mobile station 20 provides feedback of V1, V2_MU, and V2_SU to the base station 10 (S420).

On the other hand, when the received radio signal is a V1*CSI_RS (S408), the mobile station 20 obtains a channel matrix H that is multiplied by V1 from the reception result of a V1*CSI_RS (S424). In addition, the mobile station 20 determines V2_MU on the basis of the channel matrix H that is multiplied by V1 without performing calculation using V1 (S428). In addition, the mobile station 20 provides feedback of V2_MU to the base station 10 (S432).

In addition, when the received radio signal is a data signal (S408), the mobile station 20 demodulates the data signal and obtains data that is transmitted from the base station 10 (S436).

6. CONCLUSION

As described above, the base station 10 according to the embodiments of the present disclosure starts to transmit a V1*CSI_RS after determination of transmission weight V1. By such configuration, calculation load such as V2_MU in the mobile station 20 that is described below can be suppressed. In addition, the base station 10 according to the embodiments of the present disclosure continues to transmit a CSI_RS. By such configuration, the mobile station 20 can determine V2_SU on the basis of reception of a CSI_RS. As a result, dynamic switching of MU-MIMO and SU-MIMO can be realized.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, two or more of the first embodiment to the seventh embodiment may be combined. For example, the resource allocation in the time direction that is described in the third embodiment, the resource allocation in the frequency direction that is described in the fifth embodiment, and the resource allocation for SU-MIMO and MU-MIMO that is described in the sixth embodiment can be combined.

In addition, the steps in the processing of the base station 10 or the processing of the mobile station 20 in this specification are not necessarily processed in chronological order in accordance with the order that is described as the flowchart. For example, the steps in the processing of the base station 10 or the processing of the mobile station 20 may be processed in order different from the order that is described as the flowchart, or may be processed in parallel.

In addition, a computer program can be created that exerts hardware such as a CPU, a ROM, and a RAM, which is built in the base station 10 or the mobile station 20 as a function equivalent to each configuration of the above-described base station 10 or the mobile station 20. In addition, a storage medium that stores the computer program is also provided.

REFERENCE SIGNS LIST 10 base station
20, 20A, 20B mobile station
110, 210 antenna
116, 216 switch SW
120, 220 analog processing unit
124, 224 AD/DA conversion unit
128, 228 demodulation processing unit
132, 232 upper layer signal processing unit
136 scheduler
140, 240 modulation processing unit
150 weight multiplication unit
152 V2_SU multiplication unit
154 V1 multiplication unit
156 V2_MU multiplication unit
244 channel matrix obtaining unit
248 weight determination unit

The invention claimed is:

1. An electronic device comprising circuitry configured to:
   cause receipt of a first reference signal or a second reference signal, the second reference signal being weighted, the first reference signal being transmitted using a first resource for SU-MIMO (Single User-Multiple Input Multiple Output) and the second reference signal being transmitted using a second resource for MU-MIMO (Multiple User-Multiple Input Multiple Output);
   receive notice information for discriminating the first resource and the second resource;
   obtain channel information based on the first reference signal or the second reference signal, the first reference signal being used to estimate first channel information in the SU-MIMO and the second reference signal being used to estimate second channel information in the MU-MIMO; and
   cause transmission of the first transmission weight information and the second transmission weight information, the first transmission weight information being determined based on the first channel information and the second transmission weight information being determined based on the second channel information, wherein
   the second reference signal is received more frequently than the first reference signal,
   the second transmission weight information is transmitted more frequently than the first transmission weight information, and
   a density ratio in a frequency domain of the second resource is higher than that of the first resource.

2. The electronic device of claim 1, wherein the first transmission weight information is related to directivity and the second transmission weight information is related to phase.

3. The electronic device of claim 1, wherein the circuitry is further configured to determine the second transmission weight information based on the first transmission weight information, the first transmission weight information being determined before the second transmission weight information.

4. The electronic device of claim 1, wherein the notice information is related to at least one of transmission timing, order or identification data.

5. The electronic device of claim 4, wherein the notice information is received via RRC signaling.

6. The electronic device of claim 4, wherein the notice information is received via system information.

7. The electronic device of claim 1, wherein the first reference signal corresponds to a CSI-RS (Channel State Information-Reference Signal).

8. The electronic device of claim 1, wherein the second reference signal corresponds to a CSI-RS (Channel State Information-Reference Signal).

9. The electronic device of claim 1, wherein the circuitry is further configured to determine the first transmission weight information or the second transmission weight information as an index of one of a plurality of predetermined codebooks.

10. The electronic device of claim 9, wherein a number of the plurality of predetermined codebooks is 16.

11. The electronic device of claim 1, wherein the first transmission weight information covers a wider frequency than the second transmission weight information.

12. The electronic device of claim 1, wherein the second transmission weight information is determined as a function of the first transmission weight information.

13. The electronic device of claim 1, wherein
the circuitry is further configured to cause communication to be performed in MU-MIMO mode or SU-MIMO mode, and
the MU-MIMO mode enables multiple user equipment to share the second resource.

14. The electronic device of claim 13, wherein the circuitry is further configured to allocate more resources to the second resource than to the first resource.

15. The electronic device of claim 13, wherein the MU-MIMO mode and the SU-MIMO mode are configured to dynamically switch.

16. The electronic device of claim 13, wherein the MU-MIMO mode utilizes a first number of streams for a first communication device and the SU-MIMO mode utilizes a second number of streams for a second communication device, the first number being different from the second number.

17. The electronic device of claim 16, wherein the second number is a quadruple of the first number.

18. The electronic device of claim 1, wherein the first resource and the second resource correspond to frequency ranges.

19. The electronic device of claim 1, wherein the first resource and the second resource correspond to resource blocks.

20. The electronic device of claim 1, wherein the notice information is received via RRC signaling.

21. The electronic device of claim 1, wherein the notice information is received via system information.

22. The electronic device of claim 1, wherein the circuitry is further configured to determine the second transmission weight information upon receipt of the first reference signal or the second reference signal.

23. The electronic device of claim 1, wherein
the circuitry is further configured to
cause receipt of a third reference signal via a third resource, and
cause transmission of third feedback information determined based on the first reference signal; and
the second reference signal is received more frequently than the third reference signal.

24. A wireless communication method comprising:
causing receipt of a first reference signal or a second reference signal, the second reference signal being weighted, the first reference signal being transmitted using a first resource for SU-MIMO (Single User-Multiple Input Multiple Output) and the second reference signal being transmitted using a second resource for MU-MIMO (Multiple User-Multiple Input Multiple Output);
receiving notice information for discriminating the first resource and the second resource;
obtaining, by circuitry, channel information based on the first reference signal or the second reference signal, the first reference signal being used to estimate first channel information in the SU-MIMO and the second reference signal being used to estimate second channel information in the MU-MIMO; and
causing transmission, by the circuitry, of the first transmission weight information and the second transmission weight information, the first transmission weight information being determined based on the first channel information and the second transmission weight information being determined based on the second channel information, wherein
the second reference signal is received more frequently than the first reference signal,
the second transmission weight information is transmitted more frequently than the first transmission weight information, and
a density ratio in a frequency domain of the second resource is higher than that of the first resource.

25. The wireless communication method of claim 24, further comprising:
causing receipt of a third reference signal via a third resource; and
causing transmission of third feedback information determined based on the first reference signal, wherein
the second reference signal is received more frequently than the third reference signal.

26. An electronic device comprising:
circuitry configured to:
cause transmission of a first reference signal or a second reference signal, the second reference signal being weighted, the first reference signal being transmitted using a first resource for SU-MIMO (Single User-Multiple Input Multiple Output) and the second reference signal being transmitted using a second resource for MU-MIMO (Multiple User-Multiple Input Multiple Output);
cause transmission of notice information for discriminating the first resource and the second resource; and
cause receipt of first transmission weight information and second transmission weight information, wherein
channel information is obtained based on the first reference signal or the second reference signal, the first reference signal being used to estimate first channel information in the SU-MIMO and the second reference signal being used to estimate second channel information in the MU-MIMO,
the first transmission weight information is determined based on the first channel information and the second transmission weight information is determined based on the second channel information,
the second reference signal is received more frequently than the first reference signal,
the second transmission weight information is transmitted more frequently than the first transmission weight information, and
a density ratio in a frequency domain of the second resource is higher than that of the first resource.

27. The electronic device of claim 26, wherein
the circuitry is configured to
cause transmission of a third reference signal via a third resource, and cause receipt of third feedback information determined based on the first reference signal; and the second reference signal is received more frequently than the third reference signal.

* * * * *